US010713045B2

(12) United States Patent
Jaffari et al.

(10) Patent No.: US 10,713,045 B2
(45) Date of Patent: Jul. 14, 2020

(54) COMPACT ARITHMETIC ACCELERATOR FOR DATA PROCESSING DEVICES, SYSTEMS AND METHODS

(71) Applicant: Atlazo, Inc., La Jolla, CA (US)

(72) Inventors: Javid Jaffari, La Jolla, CA (US); Rshdee Alhakim, La Jolla, CA (US); Salem Emara, La Jolla, CA (US)

(73) Assignee: Atlazo, Inc., La Jolla, CA (US)

( * ) Notice: Subject to any disclaimer, the term of this patent is extended or adjusted under 35 U.S.C. 154(b) by 0 days.

(21) Appl. No.: 16/242,839

(22) Filed: Jan. 8, 2019

(65) Prior Publication Data

US 2019/0235867 A1 Aug. 1, 2019

Related U.S. Application Data

(60) Provisional application No. 62/614,914, filed on Jan. 8, 2018, provisional application No. 62/614,919, filed on Jan. 8, 2018.

(51) Int. Cl.
*G06F 9/30* (2018.01)
*G06F 15/80* (2006.01)
(Continued)

(52) U.S. Cl.
CPC ...... *G06F 9/30036* (2013.01); *G06F 7/49947* (2013.01); *G06F 7/5443* (2013.01);
(Continued)

(58) Field of Classification Search
CPC .................................................. G06F 9/30036
See application file for complete search history.

(56) References Cited

U.S. PATENT DOCUMENTS

| 7,937,559 B1 * | 5/2011 | Parameswar | ....... G06F 9/30014 |
| | | | 712/36 |
| 2003/0009502 A1 | 1/2003 | Katayanagi | |

(Continued)

FOREIGN PATENT DOCUMENTS

WO 9811483 A1 3/1998

OTHER PUBLICATIONS

Y.-H. Chen, J. Emer, V. Sze, "Eyeriss: A Spatial Architecture for Energy-Efficient Dataflow for Convolutional Neural Networks," International Symposium on Computer Architecture (ISCA), pp. 367-379, Jun. 2016.

(Continued)

*Primary Examiner* — Michael J Metzger
(74) *Attorney, Agent, or Firm* — Perkins Coie LLP

(57) ABSTRACT

Disclosed are methods, devices and systems for all-in-one signal processing, linear and non-linear vector arithmetic accelerator. The accelerator, which in some implementations can operate as a companion co-processor and accelerator to a main system, can be configured to perform various linear and non-linear arithmetic operations, and is customized to provide shorter execution times and fewer task operations for corresponding arithmetic vector operation, thereby providing an overall energy saving. The compact accelerator can be implemented in devices in which energy consumption and footprint of the electronic circuits are important, such as in Internet of Things (IoT) devices, in sensors and as part of artificial intelligence systems.

27 Claims, 27 Drawing Sheets

(51) Int. Cl.
*G06F 9/38* (2018.01)
*G06F 12/1081* (2016.01)
*G06F 17/14* (2006.01)
*G06F 7/499* (2006.01)
*G06F 7/544* (2006.01)

(52) U.S. Cl.
CPC .......... *G06F 9/3001* (2013.01); *G06F 9/3877* (2013.01); *G06F 12/1081* (2013.01); *G06F 15/8061* (2013.01); *G06F 17/142* (2013.01)

(56) References Cited

U.S. PATENT DOCUMENTS

| | | | |
|---|---|---|---|
| 2003/0014457 A1 | 1/2003 | Desai | |
| 2012/0216011 A1 | 8/2012 | Gove | |
| 2014/0115301 A1* | 4/2014 | Sanghai | G06F 9/30072 712/220 |
| 2014/0195775 A1* | 7/2014 | Ould-Ahmed-Vall | G06F 9/30036 712/5 |
| 2016/0291974 A1* | 10/2016 | Lingam | G06F 9/3013 |
| 2016/0292127 A1 | 10/2016 | Lingam et al. | |
| 2017/0177357 A1* | 6/2017 | Ould-Ahmed-Vall | G06F 9/30036 |
| 2019/0251425 A1 | 8/2019 | Jaffari et al. | |

OTHER PUBLICATIONS

Chao Wang, Lei Gong, Qi Yu, Xi Li, Yuan Xie, Xuehai Zhou, "DLAU: A Scalable Deep Learning Accelerator Unit on FPGA", IEEE Transactions on Computer-Aided Design of Integrated Circuits and Systems ( vol. 36 , Issue: 3 , Mar. 2017 ).

Matthieu Courbariaux, Itay Hubara, Daniel Soudry, Ran El-Yaniv, Yoshua Bengio, "Binarized Neural Networks: Training Deep Neural Networks with Weights and Activations Constrained to +1 or −1". arxiv.org, Mar. 17, 2016, pp. 1-11.

Mohammad Rastegari, Vicente Ordonez, Joseph Redmon, Ali Farhadi, "XNOR-Net: ImageNet Classification Using Binary Convolutional Neural Networks", European Conference on Computer Vision ECCV 2016: Computer Vision—ECCV 2016 pp. 525-542.

International Application No. PCT/US2019/012724 International Search Report and Written Opinion dated Apr. 26, 2019, pp. 1-11.

* cited by examiner

10,713,045 B2

COMPACT ARITHMETIC ACCELERATOR FOR DATA PROCESSING DEVICES, SYSTEMS AND METHODS

CROSS-REFERENCE TO RELATED APPLICATIONS

This application claims priority to and benefits of U.S. Provisional Patent Application No. 62/614,914, titled "COMPACT SIGNAL PROCESSING, LINEAR AND NON-LINEAR VECTOR ARITHMETIC ACCELERATOR FOR DATA PROCESSING DEVICES, SYSTEMS AND METHODS" and filed Jan. 8, 2018, and U.S. Provisional Patent Application No. 62/614,919, titled "COMPACT ARITHMETIC ACCELERATOR FOR DATA PROCESSING DEVICES, SYSTEMS AND METHODS" and filed Jan. 8, 2018. The entire contents of the above noted provisional applications are incorporated by reference as part of the disclosure of this patent document.

TECHNICAL FIELD

This patent document relates to compact data processing devices, systems and methods.

BACKGROUND

The Internet of things (IoT) is the network of physical devices that can include appliances, vehicles and other devices that have embedded electronics, software, and network connectivity to enable these physical devices to connect and exchange data. Each physical device of the IoT can be uniquely identifiable through its embedded computing system and able to communicate with other devices using the existing infrastructure of the Internet. While not limited to IOT, the small form factor, ultra-low power consumption, and low cost requirements make power consumption and physical footprint of the associated circuitry critically important in IoT applications since they directly impact the battery lifetime, cost and efficiency of such systems.

SUMMARY OF CERTAIN EMBODIMENTS

Disclosed are compact, all-in-one devices having an architecture for a signal processing, linear and non-linear vector arithmetic accelerator for data processing devices, systems and methods, such as for, but not limited to, IoT devices. The disclosed accelerator devices, systems and methods can be used to support existing processing units and devices, among other operations, for vector operations (e.g., signal processing, linear algebra, and non-linear algebra routines and/or other fixed point and floating point arithmetic operations or algorithms). In various embodiments, the accelerator includes a single, programmable compute engine and configurable internal memory that can supplement the processing of a data processing system for such vector operations, and do so in a single instance, thereby minimizing the system's required area (footprint) and energy usage. In various implementations, the disclosed accelerator is optimized for machine learning and various deep learning models for ultra-low power IoT and wearable devices, especially as it pertains to dealing with health monitoring sensors.

DETAILED DESCRIPTION

Figure 1:
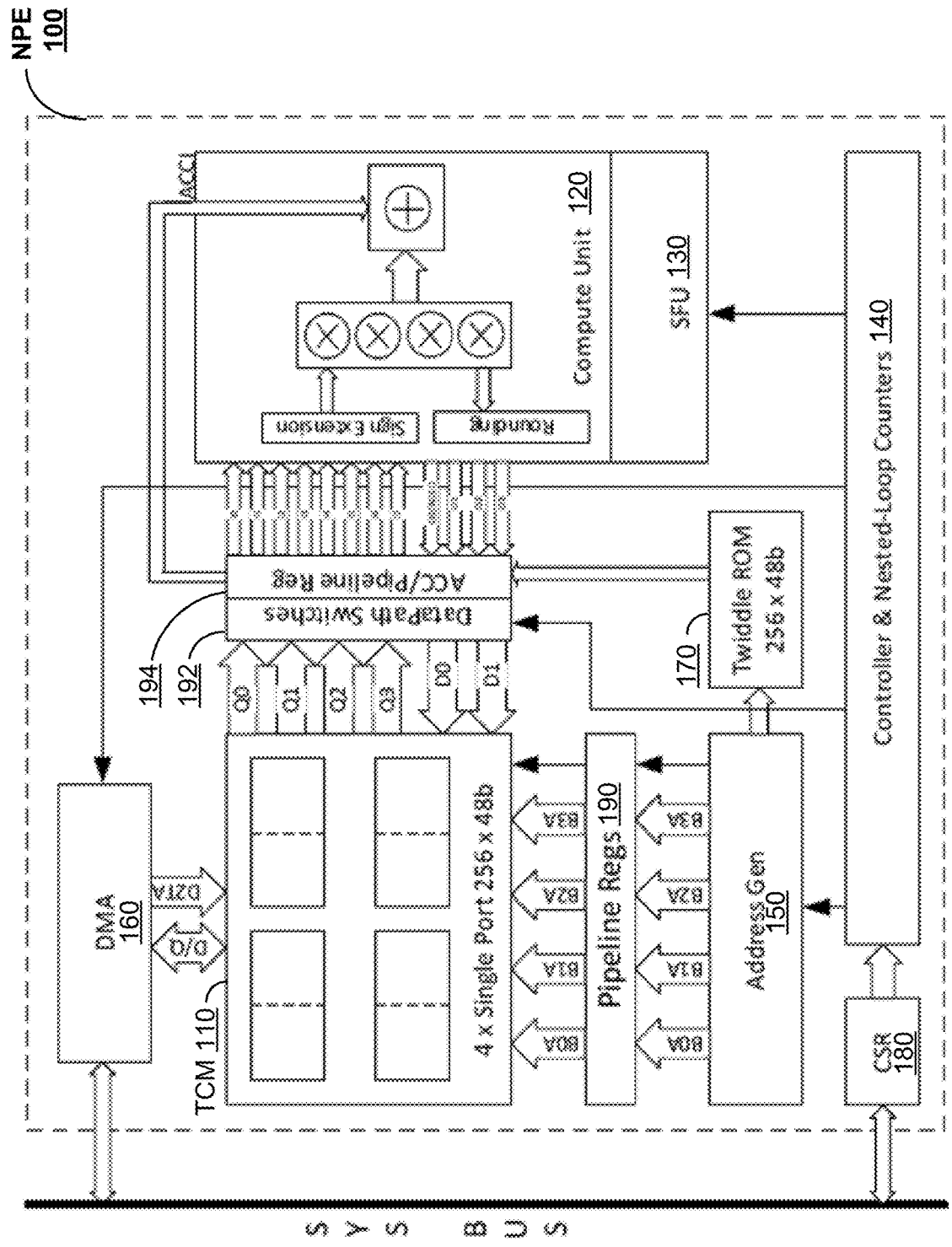
FIG. 1 illustrates a diagram depicting a top-level architecture of an example embodiment of a compact, all-in-one signal processing, linear and non-linear vector arithmetic accelerator in accordance with the present technology.

Basic vector operations are commonly used in many applications in machine learning, computer vision, audio processing, image processing, and video processing. These basic operation can, for example, include (i) signal processing functions such as Fast Fourier Transform (FFT) and Finite Impulse Response (FIR) filters, (ii) linear algebra vector algebra, such as sum of two vectors, dot multiply of two vectors, element-wise multiply of two vectors, linear scaling and offset transfer of a vector elements, sum of all vectors elements, sum of squares of all vectors elements, sum of power of two of two vectors, and weighted sum of two vectors, and (iii) non-linear single input functions on elements of a vector, such as exponential, logarithm, and square root.

The energy consumption of executing these fundamental routines on instruction-set based processors such as general CPUs, DSPs, and GPUs limits the use of various technologies for Internet of Things (IoT), wearable devices, and other power sensitive applications due to battery life constraints.

Conventionally, vector operations are executed either on single-instruction issue processors, or accelerated multi or many core, VLIW, or SIMD architectures such as multi-threaded CPUs, DSPs, or GPUs. These architectures are very flexible in terms of executing any vector compute routines but consume large silicon area and/or large amounts of energy due to long execution time, memory transaction energy, or the processor internal power. Signal processing, linear algebra, and non-linear algebra routines could be accelerated in dedicated and separated co-processors accompanying a general purpose host processor. However, conventional processing devices and systems capable of executing vector operations require considerable energy and size, and thereby are not suitable for IoT, wearable device applications or other applications that are power sensitive.

An energy and size (e.g., semiconductor area) optimum solution is needed to capture all these functionalities in a single non instruction-set based and configurable compute engine.

For example, circuits proposed for IoT devices address some of the IoT requirements including, wireless connectivity, data processors, storage, power management, and input/output (I/O) capability. However, the necessary small form factor, ultra-low energy consumption, and low cost are less addressed. Low energy consumption and higher energy efficiencies are critical in IoT applications since they directly impact the battery lifetime of the system. Therefore, data processing circuits that can provide more energy efficiency, smaller size, and lower cost to central processing units are needed in order to supplement data processing in IoT devices, wearable devices, and other devices for portable device applications.

Disclosed devices include a compact, all-in-one architecture for a signal processing, linear and non-linear vector arithmetic accelerator for data processing devices, systems and methods, such as for IoT devices. The architecture of the disclosed accelerator devices, systems and methods is engineered to support the aforementioned vector operations functionalities (e.g., signal processing, linear algebra, and non-linear algebra routines and/or other fixed point arithmetic functions or algorithms) based on a single programmable compute engine. In some implementations, the accelerator is architected to include fully configurable internal memory and compute units that can support all of the listed routines in a single instance, which minimizes the device area and energy and/or power consumption. The disclosed accelerator can be employed in IoT, wearable and other devices used to implement various types of data processing techniques, including audio signal and/or video signal processing algorithms, machine learning algorithms, etc., which is envisioned to enable the scalability and widespread growth of such devices.

Various embodiments of the disclosed compact, all-in-one signal processing, linear and non-linear vector arithmetic accelerator are described, which is also referred to as a "neural processing engine" (NPE) or "compact data processing accelerator." In some implementations, the NPE can be implemented as a companion co-processor and accelerator to a main system host CPU (e.g., typically Cortex-M family, referred to as a CM CPU). One example advantage of the NPE is to reduce total energy consumption of the fixed point vector operations, by acceleration. For example, in some implementations of vector operations by the NPE, the NPE may consume more power than a typical low-power host CPU (such as Cortex-M0) during a task operation, yet the acceleration will result in a shorter execution time and fewer task operations, and thereby provides an overall energy saving. For example, the NPE can also reduce the total system energy consumption by reducing the number of system memory accesses. The same task running on a CM CPU requires many load and stores operations, while the NPE reduces or makes them more efficient by leveraging its tightly coupled memory. The NPE can also eliminate code read activities from ROM or eFlash as an alternative to an ISA based host CPU.

It is noted that, in this document, the terms "task", "function" and "operation" may be used interchangeably and bear the same meaning as it relates example embodiments of the compact, all-in-one accelerator.

In some example implementations, the NPE core is configured to perform a fixed number of hardened tasks. Each task starts with loading all its required data from system memory, followed by executing (computing) the result, and ends with writing back the results into system memory. Notably, the NPE is not an instruction-set architecture and performs only one operation, and then it has to be instructed to fire the next task. Tasks and all the accompanying operands (e.g., such as memory addresses) are programmed to the NPE's internal control and status register (CSR) bank.

In some example implementations, the NPE is configured to operate as a hands-off co-processor that performs vector operations on a chunk of data sitting on the system memory. An operation starts with the main processor programming the register space, i.e., the control status register (CSR). For example, the CSR content can include the operation type, the size of the vectors, the address of the input vectors sitting in the system memory, and the address of the output (result) vector that has to be written back to the system memory.

In some example implementations, at least three types of operations are supported by the NPE. These example operations are listed in Tables 1, 2, and 3. Table 1 shows signal processing functions for FFT, FIR and FIR.X. Table 2 shows non-linear functions, including SQRT, LOG N, EXP. Table 3 shows linear algebra functions. Capital letters in the equations represent vectors, while small letters are representative of scalars. In Tables 1, 2 and 3, "f" represents filter size; "d" represents shifts, and "n" represents vector length. All operations receive at least one vector, but may or may not generate a vector result. The total number of cycles includes from start to end of the operation, including data in and out from/to system memory and including the computation. In some implementations of the NPE, an extra 10-15 cycles per operation can be assumed for the NPE state machine to march through the states from start to end, and some extra cycles for the main CPU to program the NPE's CSR registers.

TABLE 1

Example Signal Processing Functions

| OP | Equation | Cycles |
| --- | --- | --- |
| FFT | O = FFT(X) | 0.5n * log2(n) + 4n |
| FIR | O[i: f . . . n] = $\Sigma_{j=0}^{f} X_{i-j} \cdot F_j$ | 0.25f * (n − f) + 2n + f |
| FIR.X | FIR change X | 0.25f * (n − f) + 2n |

TABLE 2

Example Special (non-linear) Functions

| OP | Equation | Cycles |
| --- | --- | --- |
| SQRT | O = SQRT.FX(X) | 8n |
| LOGN | O = LOGN.FX(X) | 7.5n |
| EXP | O = EXP.FX(X) | 7n |

TABLE 3

Example Linear Algebra Functions

| OP | Equation | Cycles |
| --- | --- | --- |
| MAR | O = $\Sigma_{i=0}^{n} X_i \cdot Y_i$ | 2.25n |
| MAR.X | MAR change X | 1.25n |
| ACORR | O[t: 0 . . . d] = $\Sigma_{i=t}^{n} X_{i-t} \cdot X_i$ | 0.25n*d + n |
| L2NORM | O = $\Sigma_{i=0}^{n} X_i^2$ | 1.25n |
| ACC | O = $\Sigma_{i=0}^{n} X_i$ | 1.25n |
| XPY/XMY | O = X ± Y | 3.5n |
| XSPYS/ XSMYS | O = $X^2 \pm Y^2$ | 3.5n |
| AXPBY | O = aX + bY | 3.5n |
| AXPB | O = aX + b | 2.5n |
| XTY | O = X · Y | 3.5n |
| XS | O = $X^2$ | 2.5n |

NPE micro-architecture is built to perform execution of vector operations, like the examples listed above, in a pipeline way. The execution is defined as activities between data transfers (input vector and results) from and to system memory. As such, the micro-architecture is designed to handle the following steps concurrently:

Address Generate→Memory Read→Compute→Memory Write/Accumulate.

In some embodiments of the NPE, for example, the NPE includes a tightly coupled memory including a random access memory and a plurality of logic circuits; a compute unit comprising a plurality of additional logic circuits; and an address generator unit configured to produce a set of addresses corresponding to specific contents of the random access memory, in which the same NPE is configurable to perform a plurality of arithmetic operations based on a received command or commands, and in which a particular subset of the logic circuits and the additional logic circuits are activated for a corresponding arithmetic operation. In some embodiments, the NPE can further include a special functions unit in communication with the compute unit and configured to execute iteration steps associated with fixed point calculations including exponential, logarithm, and square root vector operations. Examples of the plurality of arithmetic operations include (i) a signal processing function including one or both of Fast Fourier Transform (FFT) and Finite Impulse Response (FIR) filters; (ii) a linear algebra vector algebra function including one or more of a sum of two vectors, dot multiply of two vectors, element-wise multiply of two vectors, linear scaling and offset transfer of a vector elements, sum of all vectors elements, sum of squares of all vectors elements, sum of power of two of two vectors, and weighted sum of two vectors; and/or (iii) a non-linear single input function on elements of a vector including an exponential, a logarithm, or a square root. In some implementations, the NPE is configured to perform the plurality of arithmetic operations using a pipeline protocol that utilizes less clock cycles than that when the arithmetic operations are processed by a central processing unit. In some implementations, the compact data processing accelerator is configurable to perform any of the plurality of arithmetic operations. For each of the arithmetic operations, however, only a subset of the logic circuits is in active state, thus effectuating power savings while at the same time providing the needed versatility for implementation of a wide range of arithmetic operations.

FIG. 1 shows a diagram depicting a top-level architecture of an example embodiment of a compact, all-in-one signal processing, linear and non-linear vector arithmetic accelerator in accordance with the present technology, labeled as "NPE 100." The architecture of the NPE 100 includes the following units, modules and/or blocks, as shown in FIG. 1: Tightly Coupled Memory (TCM) 110; Compute Unit (CU) 120; Special Function Unit (SFU) 130; Controller FSM and Execution Loop Counters 140; Address Generator 150; Direct Memory Access (DMA) 160; Twiddle ROM (or LUT) 170; Control Status Register (CSR) 180; and top level pipeline registers 190, accumulator registers 194, and datapath muxes and/or switches 192. As shown in the architectural diagram of FIG. 1, the CSR 180 and DMA 160 of the NPE 100 are interfaced with the system bus such that the NPE 100 can receive data from and write data to the system. The DMA 160 is in communication with the TCM 110, which is in communication with the CU 120 via the accumulator registers 194 and the datapath switches 192 (e.g., muxes). The CU 120 is in communication with the SFU 130, which receives data from the Controller FSM and Execution Loop Counters 140 in communication from the CSR 180. The Controller FSM and Execution Loop Counters 140 controls the data received from the CSR 180 to the Address Generator 150, which provides data to the TCM 110 via the pipeline registers 190. The Address Generator 150 is in communication with the Twiddle ROM 170.

The blocks of the NPE 100 are shown in example embodiments and implementations discussed in further detail below, including example configurations during an execution of a task for a vector operation by the NPE 100.

Implementations of the NPE 100 to execute a vector operation involve four processes: (1) Operation Configure process; (2) Information Acquisition process; (3) Execution process; and (4) Post-Operation process. For example, the Operation Configure process provides the NPE 100 with what the coming job is to be performed (i.e., the system provides the NPE 100 with the information about a vector operation). The Information Acquisition process includes the NPE 100 obtaining the data from the system and writing the data internally (e.g., to the TCM 110). The Execution process includes the NPE 100 performing the operation using the pipeline protocol: Address Generate→Memory Read→Compute→Memory Write/Accumulate. The Post-Operation process includes informing the system that the operation is completed and where the output data is written.

In an example implementation to execute a vector operation, e.g., a vector arithmetic addition operation XPY (vector "x" plus vector "y"), the NPE 100 first receives the command for the example XPY operation at the config register, e.g., the CSR 180, and where in system memory the data is to run the command, e.g., address of system memory for the vector "x" and the vector "y", associated data length of the vectors, and where in system memory to write the output. The NPE 100 receives the command for the operation and address information, followed by a 'Go' command to execute the operation. The NPE 100 reads the vector data from the system memory, determines the command it must run, and writes the vector data to the TCM 110. The vector data for "x" and "y" are written to TCM 110 according to an internal memory address for the TCM 110 generated by the Address Generator 150. The vector data in TCM 110 is provided to the CU 120 to implement the compute command (e.g., vector "x" plus vector "y") and produce the output (e.g., output vector of "x"+"y"). The CU 120 includes logic circuits, including adders and multipliers, which is configurable to support various arithmetic functionalities. For example, for the XPY operation, the total cycles would be around 1,000 cycles (e.g., 3.5 n for XPY, Table 3) based on the computation performed in the single pipeline process— that is, n number of cycles to read vector "x", n number of cycles to read vector "y", n number of cycles to write the output, and only ½ n number of cycles to do the compute (e.g., since at every clock cycle, two additions can be implemented by the NPE 100). The NPE 100 performs the commanded vector operation internally, and writes the output to system memory, and provides an interrupt to the host system to inform the system that the operation is complete and where the output is in its system memory. Multiple commands can be managed by the NPE 100, but executed in a serial fashion.

Tightly Coupled Memory:

TCM 110 is the NPE's internal memory. In the example embodiment shown in FIG. 1, the TCM 110 uses single port SRAM arrays for energy and area optimization, e.g., in order to support all listed operations, and execute the read and write access in the pipeline stages, which can do so simultaneously (e.g., read and write in a single clock cycle). It should be noted that in other implementations, dual port RAMs may be used. The configurable TCM architecture of the NPE is designed to provide configurable read or write access to separate banks of the TCM 110. The example of the TCM 110 shown in FIG. 1 includes four single port memory banks, each 48 bits, e.g., due to its lower power and area requirements. Yet, it is understood that the TCM 110 can be configured to include more memory banks and/or include smaller or larger memory banks, e.g., 32 bit, 64 bit, etc.

Figure 2A:
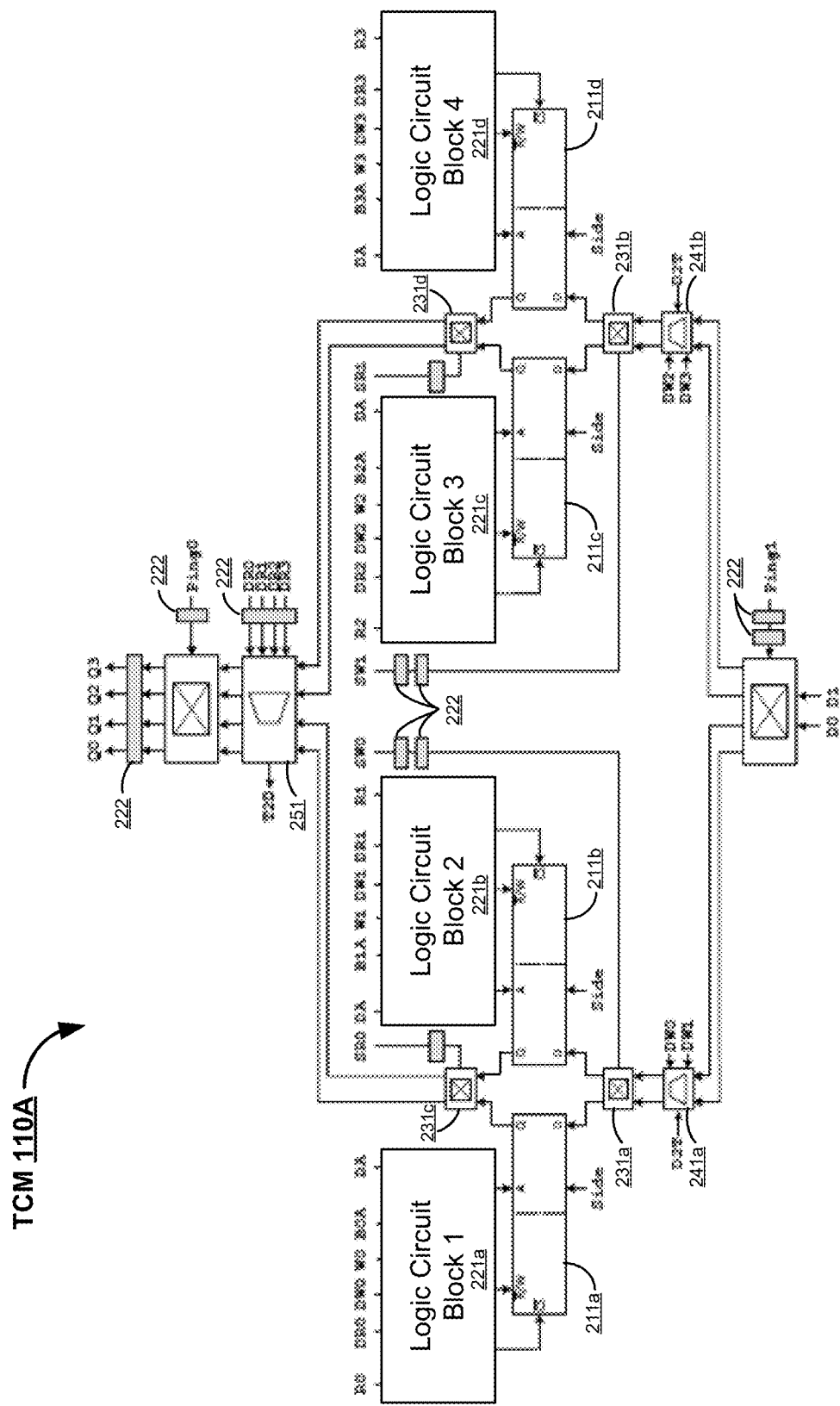
FIG. 2A illustrates a configuration of a tightly coupled memory (TCM) of the accelerator in accordance with an example embodiment.

FIG. 2A shows a schematic diagram of an example embodiment of the TCM 110, labeled as 110A. The TCM 110A includes one or more memory banks 211 (e.g., four single port 48-bit memory banks shown in the example of FIG. 2A as 211a, 211b, 211c, 211d) that store data for the accelerated arithmetic operation, in which the memory address is generated by the Address Generator 150 (see FIG. 1) via inputs B0A, B1A . . . BnA to the TCM 110. The TCM 110A includes one or more logic circuit blocks 221 (e.g., four logic circuit blocks shown in the example of FIG. 2A as 221a, 221b, 221c, 221d) that, among other operations, receive the memory address from the Address Generator 150 and write the processed data in the respective memory bank 211. The TCM 110A includes control blocks 231a and 231b that control data writing to memory banks 211; and the TCM 110A includes control blocks 231c and 231d that control data reading from the memory banks 211. For example, the control blocks 231a and 231b provide a control mechanism to know when to allow writing from DMA, e.g., as a memory bank 211 of the TCM 110 can be written from DMA 160 or from the local logic operation. The TCM 110A includes data word multiplexers 241a and 241b that select data word 1 (DW1) or data word 0 (DW0) to write to TCM 110. For example, because multiple memory banks (e.g., the four memory banks 211a-211d) can be read in parallel, the TCM 110A includes a control block 251 that selects one of the four data read lines from the TCM 110, e.g., to move to DMA 160. The diagram of FIG. 2A depicts the inputs (i.e., D0, D1) and outputs (i.e., Q0, Q1, Q2, Q3) of the TCM 110A; these outputs and inputs are received from and sent to the accumulator registers 194 that interfaces with the CU 120, as shown in FIG. 1. In FIG. 2A, gray rectangles labeled 222 represent some of the signal delay (FF) stages, e.g., for synchronizing the pipeline stages. For example, in some implementations, the write command along with its address must be delayed for 2 cycles before applying, according to Address Gen→Memory Read→Compute→Memory Write pipeline order.

The TCM signals, as shown for example embodiments of the TCM 110, are listed as below:

R0, . . . , R3: Read from corresponding banks 0, . . . , 3;

W0, . . . , W3: Write to corresponding banks 0, . . . , 3;

B0A, . . . , B3A: 8 bit address buses for accessing or writing to each bank, generated by address generator 150;

DR0, . . . , DR3: Read from corresponding banks 0, . . . , 3 for DMA consumption;

DW0, . . . , DW3: Write to corresponding banks 0, . . . , 3 by data coming from DMA;

DA: 8 bit address generated by DMA 160;

SR0, SR1: Switching the data read bus of the Bank 0 with 1, and Bank 2 with 3;

SW0, SW1: Switching the data write bus of the Bank 0 with 1, and Bank 2 with 3;

Ping0: Routing Banks 0 and 1 output to Q2 and Q3, and Banks 2 and 3 to Q0 and Q1, when asserted;

Ping1: Routing D0 and D1 to Banks 2 and 3 input when asserted, otherwise data bus writes to Banks 0 and 1;

T2D, D2T: 24 bit data busses to and from DMA 160; and

Dn, Qn: 24 bit data busses to and from compute unit 120.

During an FFT execution, for example, data are read from two banks of the TCM 110 while simultaneously the result of the butterfly operation is written in two other banks of the TCM 110.

Figure 2B:
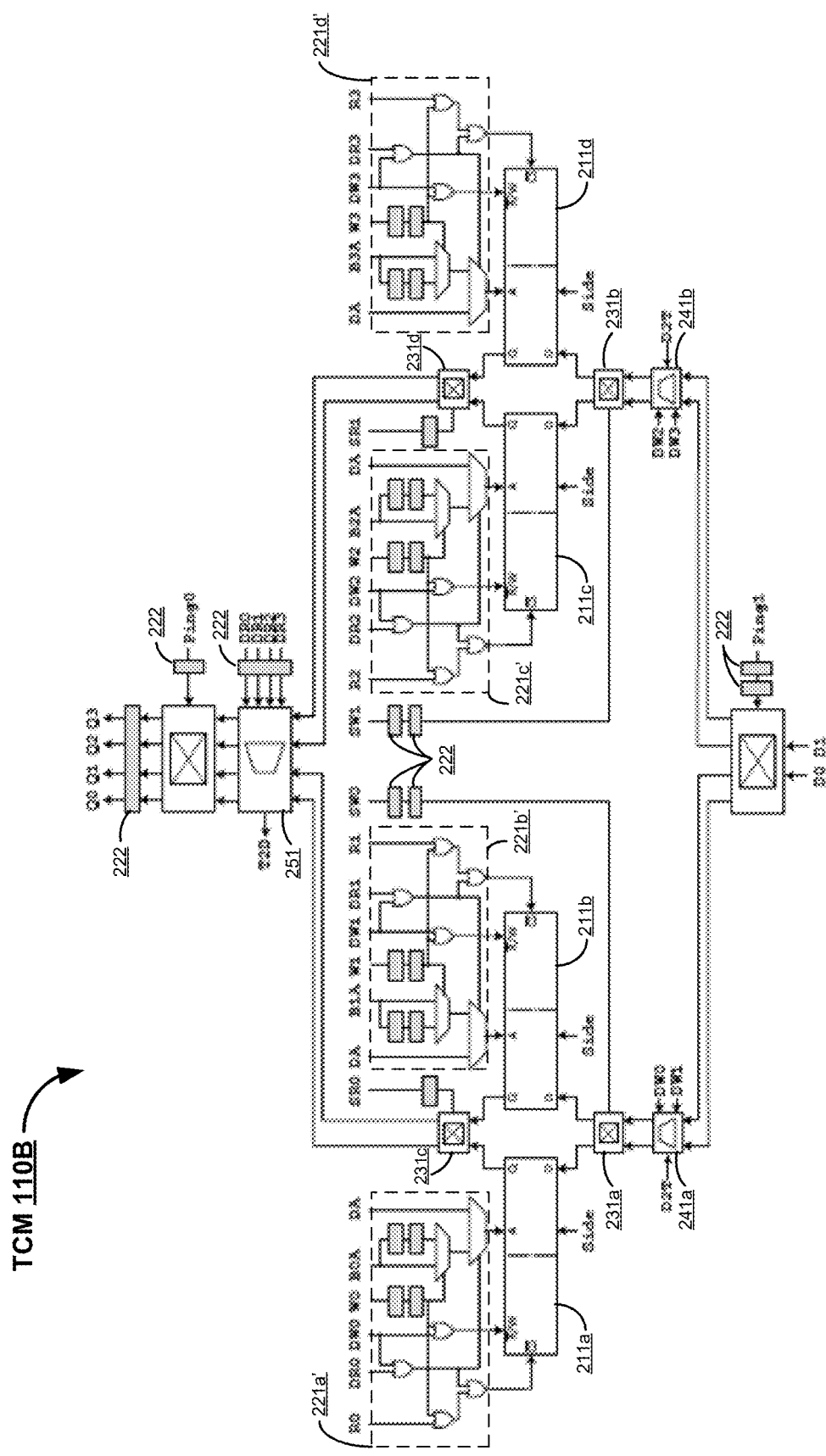
FIG. 2B illustrates a configuration of the TCM of the accelerator in accordance with another example embodiment.

FIG. 2B shows a schematic diagram of another example embodiment of the TCM 110, labeled 110B. The example embodiment of the TCM 110B shown in FIG. 2B includes all of the features of the example TCM 110A shown in FIG. 2A, but depicting a particular embodiment of the one or more logic circuit blocks 221. In this example embodiment, each logic circuit block 221a', 221b', 221c' and 221d' includes at least one stage of gates and/or multiplexers (including signal delay stages) between the inputs (i.e., R0, DR0, DW0, W0, B0A and DA for the first logic circuit block 221a) and the outputs (i.e., CS, R/W, A) to the respective memory bank 211. For example, block 221a' includes four OR gates and two multiplexers, as well as four delay units (depicted as gray-filled rectangles).

Figure 3A:
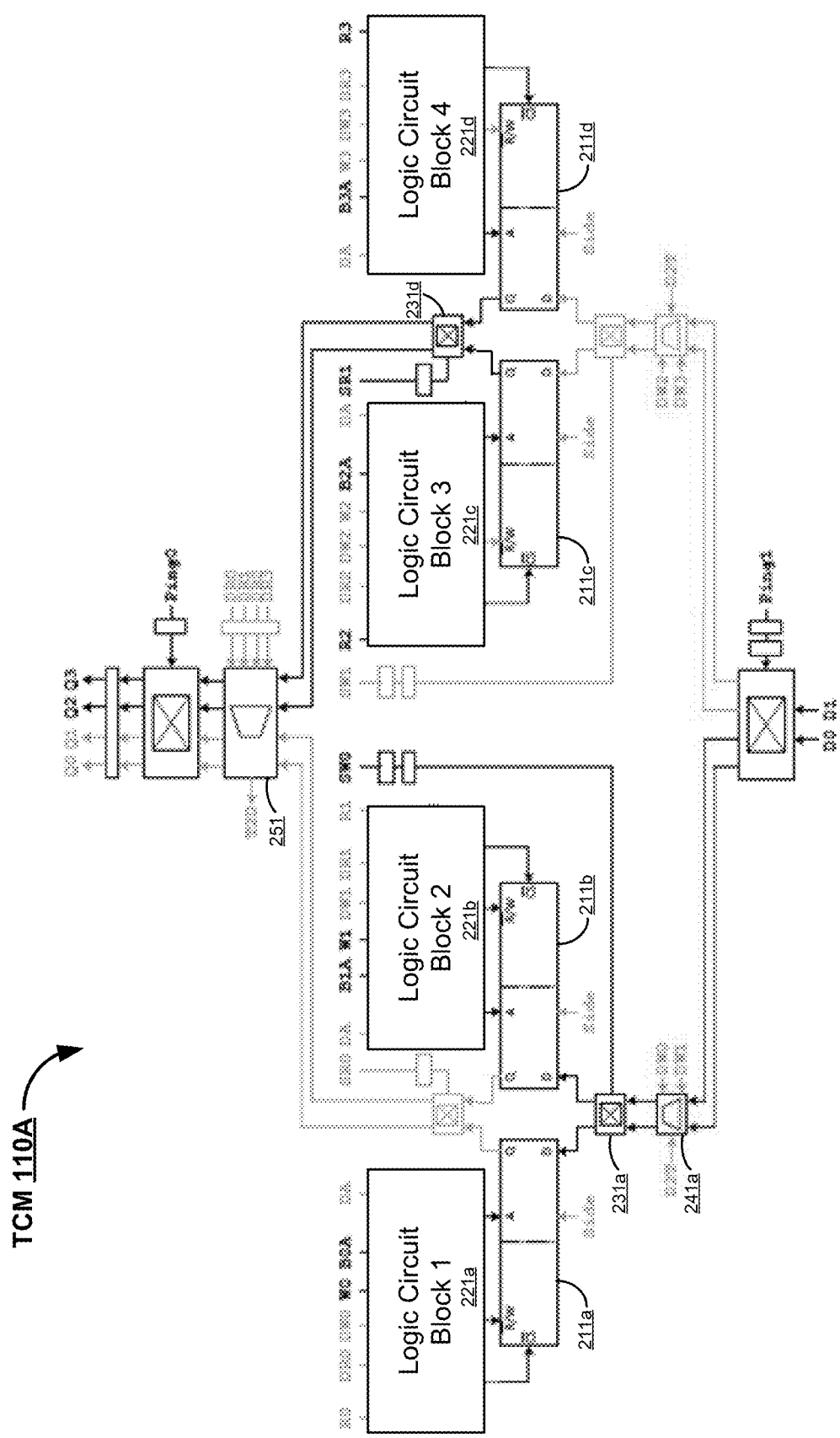
FIG. 3A shows a diagram of an example implementation of the TCM configuration shown in FIG. 2A during an FFT operation.

FIG. 3A shows an example implementation of the example TCM 110A shown in FIG. 2A during FFT execution. In this example, data are read from the memory banks 211c and 211d, in accordance with operations carried out by logical circuit blocks 221c and 221d, respectively; while, simultaneously, the result of the butterfly operation is written in the two other memory banks 211a and 211b, in accordance with operations carried out by logical circuit blocks 221a and 221b, respectively. The writeable and readable banks are ping ponged during at each FFT pass.

Figure 3B:
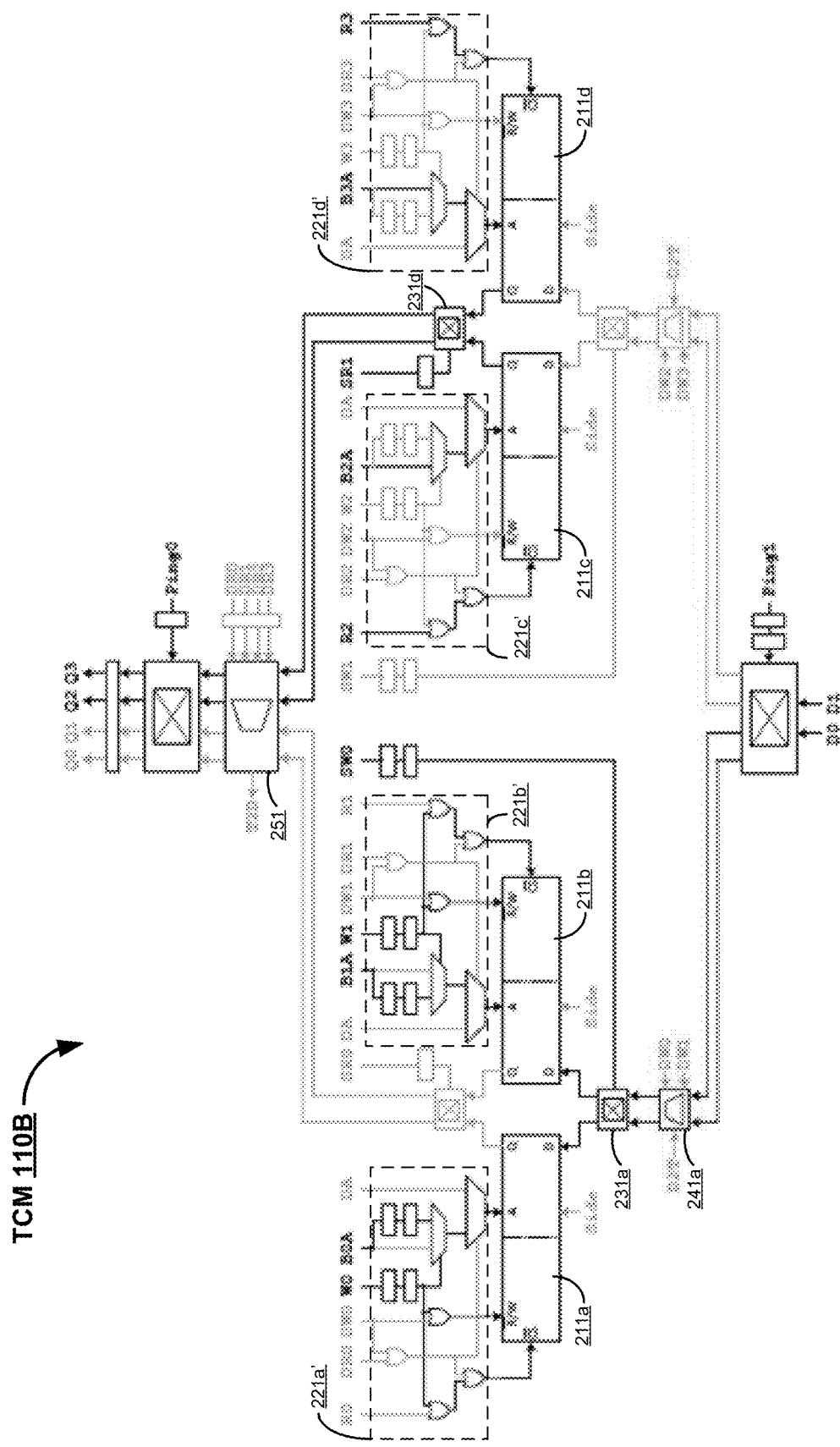
FIG. 3B shows a diagram of an example implementation of the TCM configuration shown in FIG. 2B during an FFT operation.

FIG. 3B shows the example implementation of the FFT execution by the other example embodiment of the TCM 110, i.e., TCM 110B, depicted in FIG. 2B. In FIGS. 3A and 3B (as well as in figures that follow) the components or lines that are drawn in gray represent inactive components or lines, and only the components or lines that are depicted in solid black lines remain active during the corresponding operations. In this configuration of FIG. 3B, for example, one of the OR gates in block 221a' is inactive.

Figure 4A:
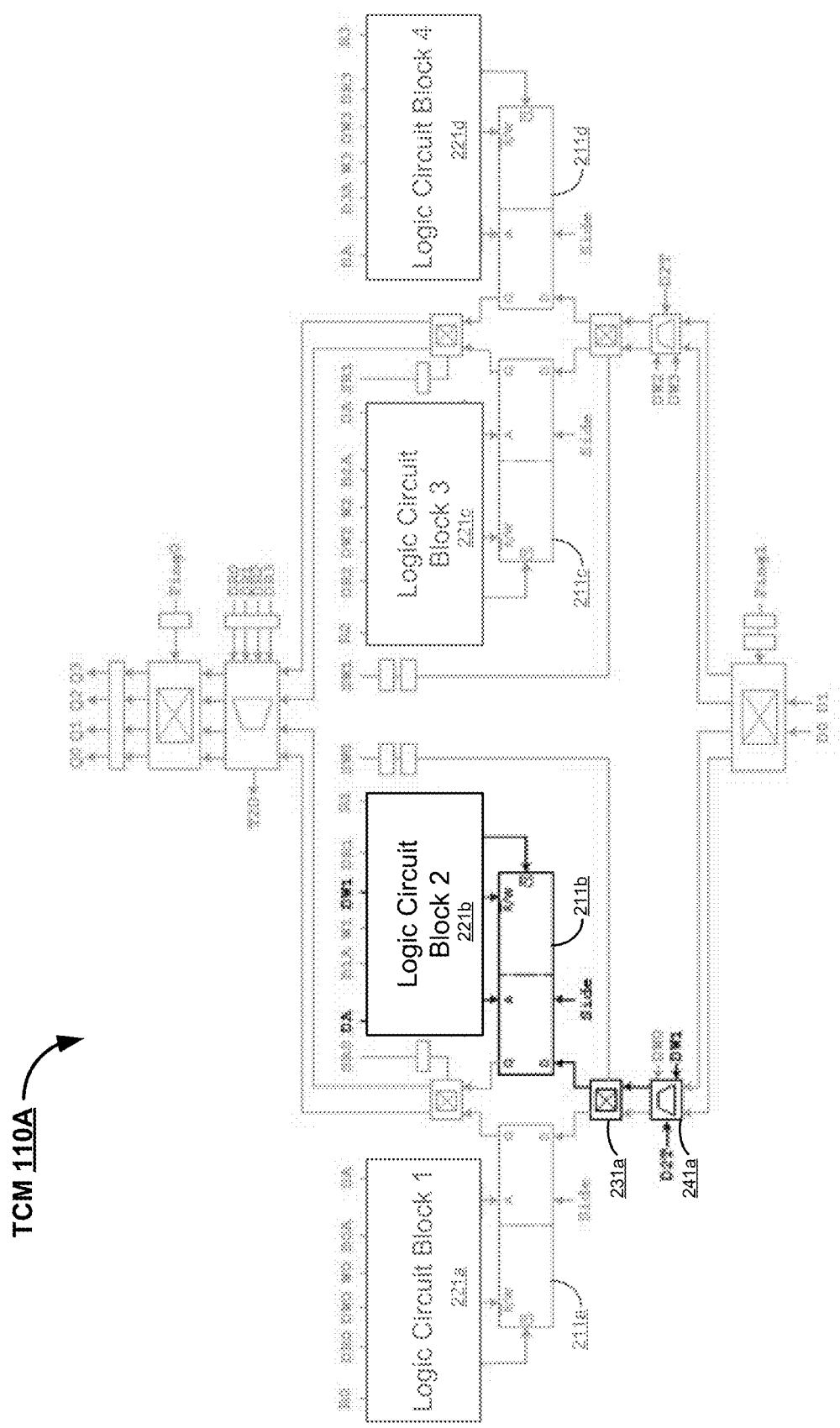
FIG. 4A shows a diagram of an example implementation of the TCM configuration shown in FIG. 2A for data movement from dynamic memory access (DMA) to the TCM.

FIG. 4A shows another example implementation of the example TCM 110A, in which the same logic structure that is shown in FIG. 2A can be configured to carry out a different operation. In the example embodiment of FIG. 4A, the TCM is configured to perform a data movement from dynamic memory access (DMA) to TCM. As evident from FIG. 4A, of the four logic blocks, only logic block 221a and one memory bank 211a (from the four memory banks) are active.

Figure 4B:
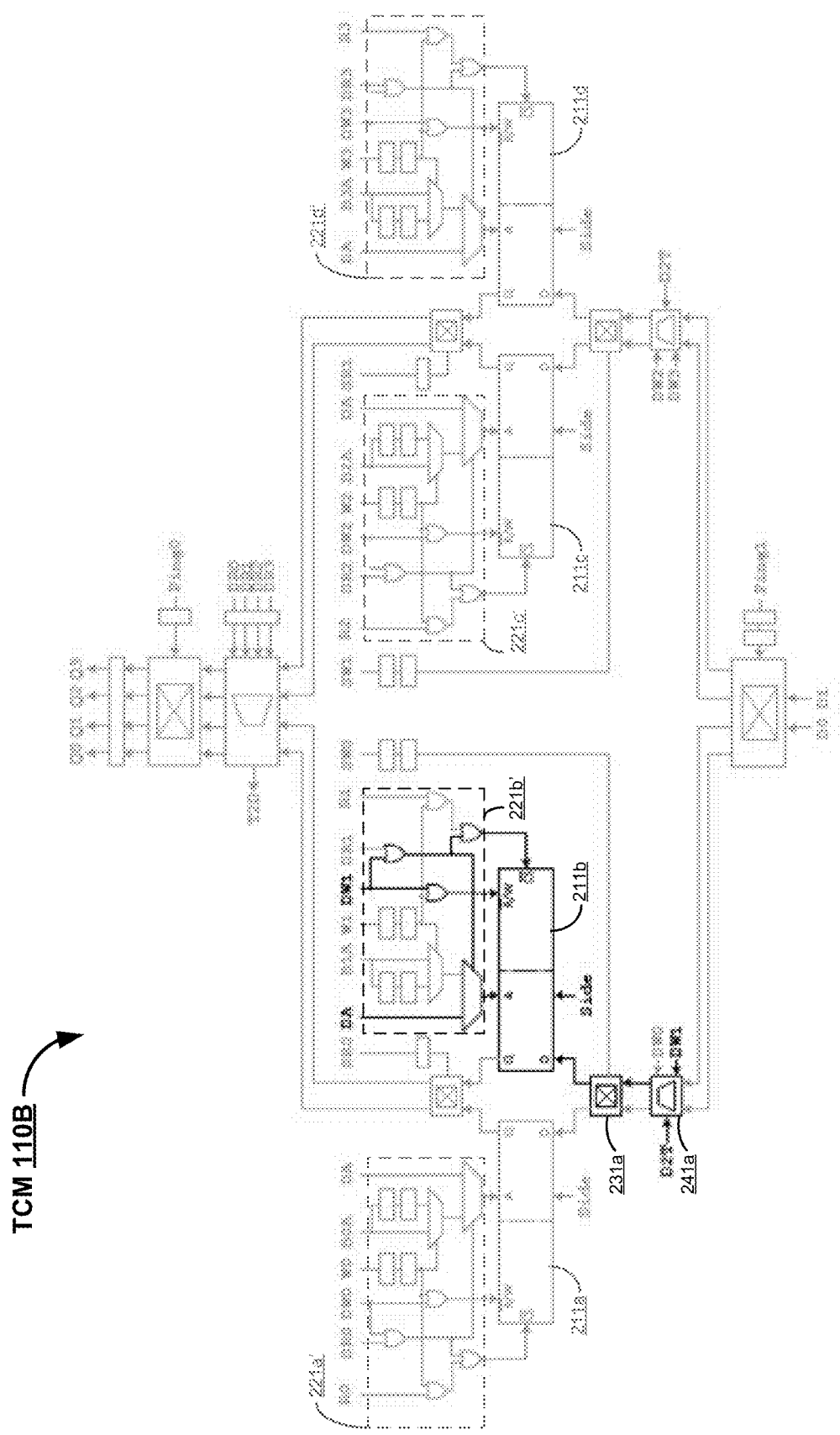
FIG. 4B shows a diagram of an example implementation of the TCM configuration shown in FIG. 2B for data movement from dynamic memory access (DMA) to the TCM.

FIG. 4B shows another example implementation of the example TCM 110B for data movement from DMA to TCM, in which only three OR gates and one multiplexer of memory block 211b' are active. As evident from the configurations of FIGS. 4A and 4B, significant power savings can be effectuated by selectively activating only the needed blocks/gates.

Figure 5A:
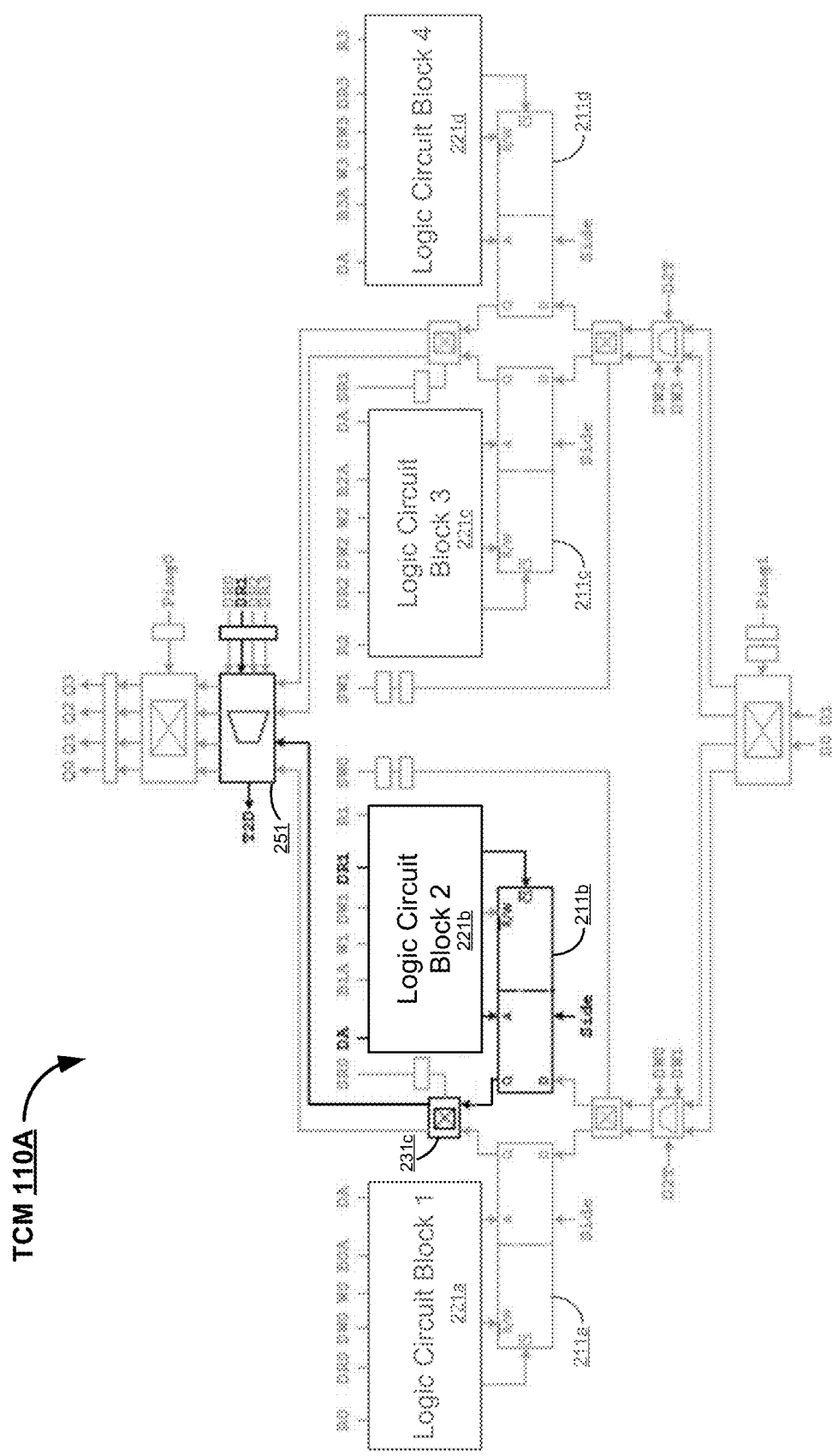
FIG. 5A shows a diagram of an example implementation of the TCM configuration shown in FIG. 2A for data movement from the TCM to the DMA.
Figure 5B:
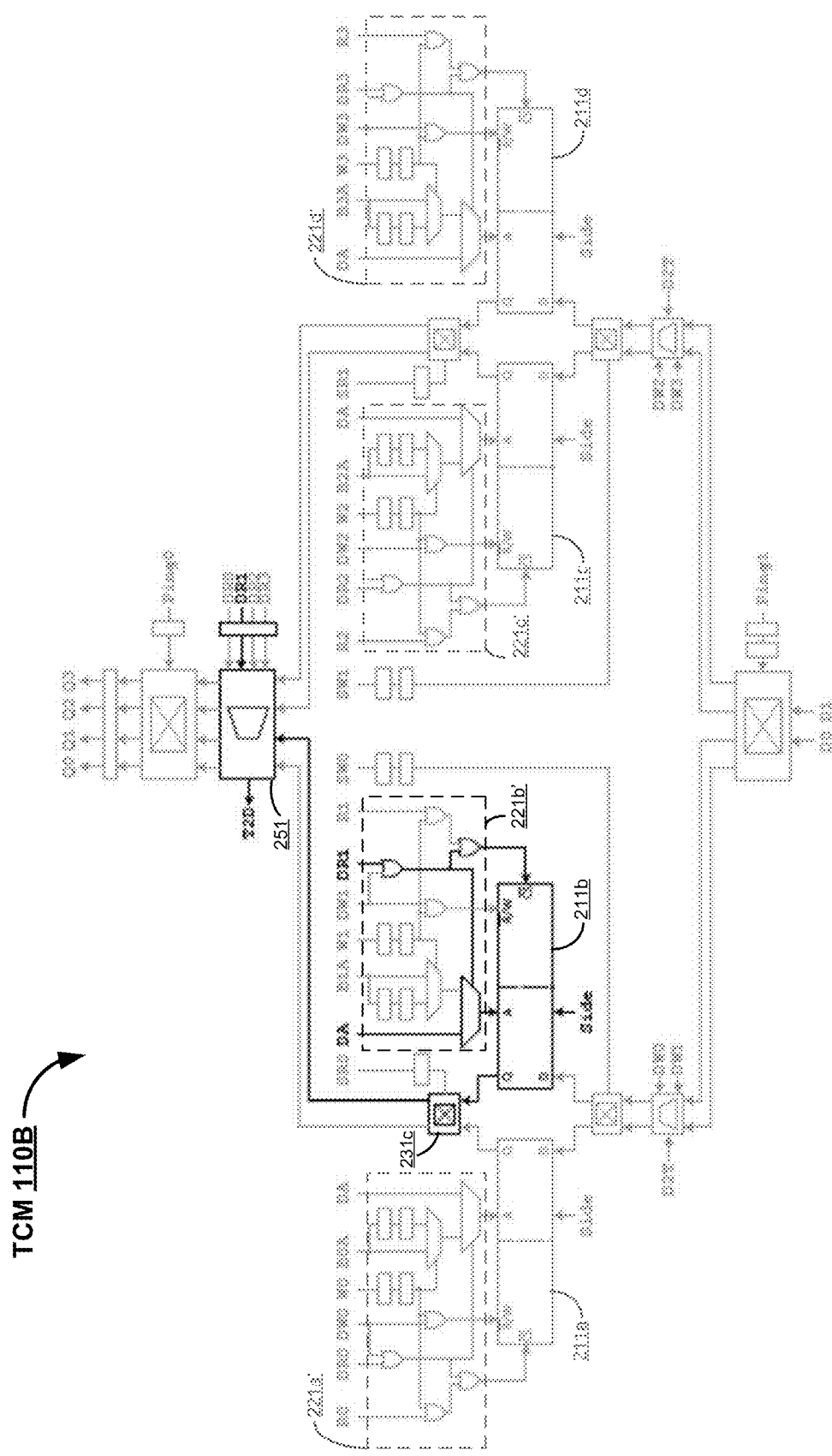
FIG. 5B shows a diagram of an example implementation of the TCM configuration shown in FIG. 2B for data movement from the TCM to the DMA.

FIGS. 5A and 5B each show another example implementation of the TCM 110A and 110B, respectively, that provide for data transfer from TCM 110 to DMA 160. In FIG. 5A, similar to the configuration of FIG. 4A, only one logic block and one memory block in the configuration of the TCM 110A is active. Additionally, compared to FIG. 4A, in the XXX and YYY in FIG. 4A are activated while ZZZ are not activated. FIG. 5B similarly illustrates that the internals of logic block 221b' in an example in which only two OR gates and one multiplexer are activated.

Compute Unit:

The compute unit (CU) 120 of the NPE 100 is a non-registered (combinatorial) and configurable arithmetic unit, capable of performing various operations needed for fixed-point and non-special functions.

Figure 6A:
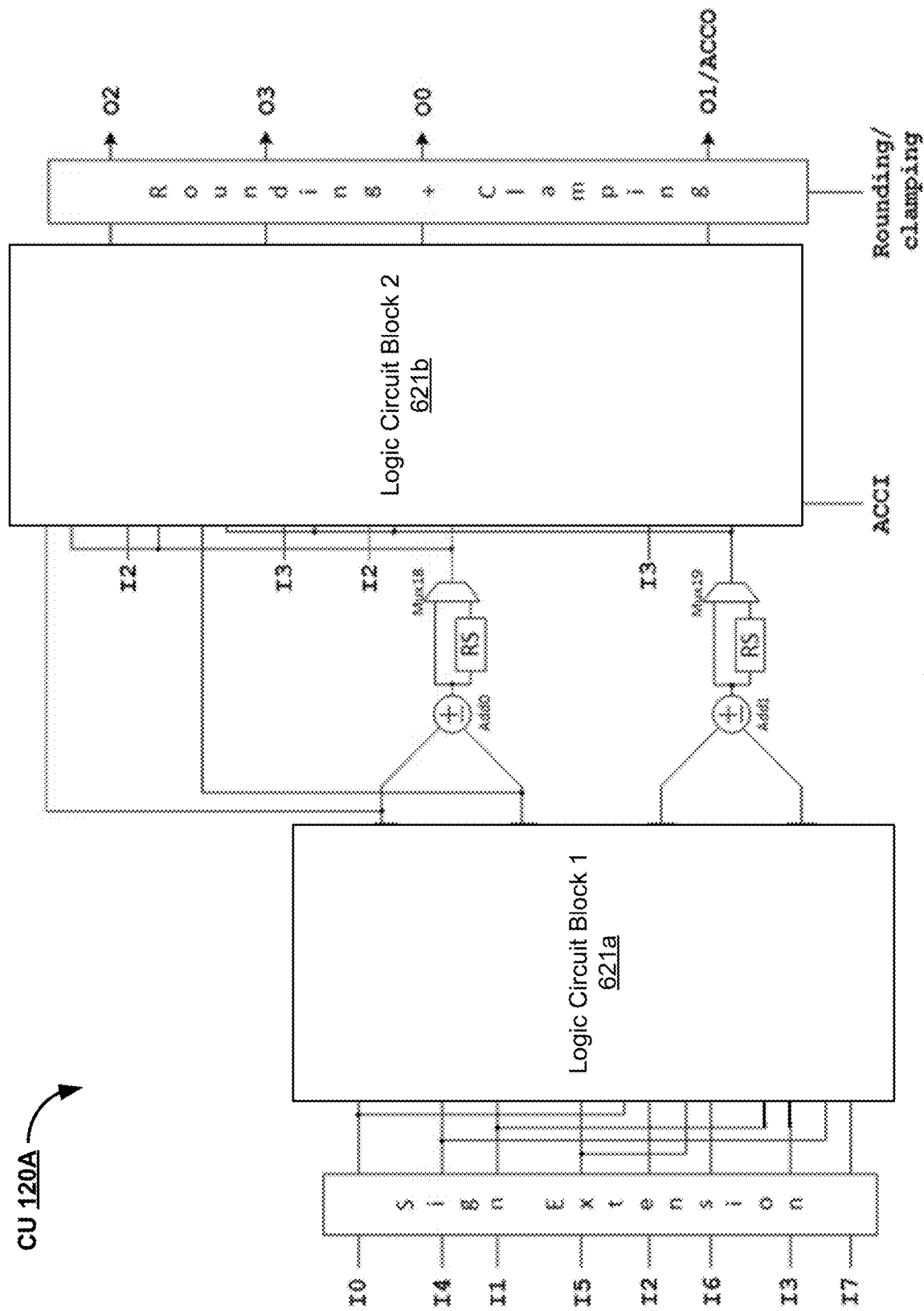
FIG. 6A illustrates a configuration of a compute unit (CU) of the accelerator in accordance with an example embodiment.

FIG. 6A shows a schematic diagram of an example embodiment of the CU 120, labeled as 120A. The CU 120A includes two logic circuit blocks 621a, 621b that includes multipliers, adders and control routing muxes between the inputs and the outputs. For this example, the CU 120A has eight 24-bit inputs (I0, . . . , I7), a 32 bit accumulate input, and four outputs of 24 bits (O0, . . . , O3), except for the O1 that is a 32-bit output used for accumulation operations. The inputs and outputs (that is, except in case of accumulation) are directly routed to the TCM 110. Each of the four outputs of the TCM 110 (i.e., Q0, . . . Q3)—see FIG. 1—that are registered are divided between two 24-bit CU inputs. The four CU outputs (i.e., O0, . . . O3) are merged and routed to the two TCM inputs (i.e., D0, D1) in the NPE 100. A top-level accumulator register is used for maintaining accumulation result. The block also features configurable input sign extension and output rounding and clamping. The CU 120A includes two rounding and shifting (RS) blocks between the logic circuit blocks 621a and 621b, which are employed in certain algebraic operations implemented by the NPE 100.

For example, for glitch and internal power saving purposes, input to multipliers and adders can be grounded in operation modes that do not require them.

Figure 6B:
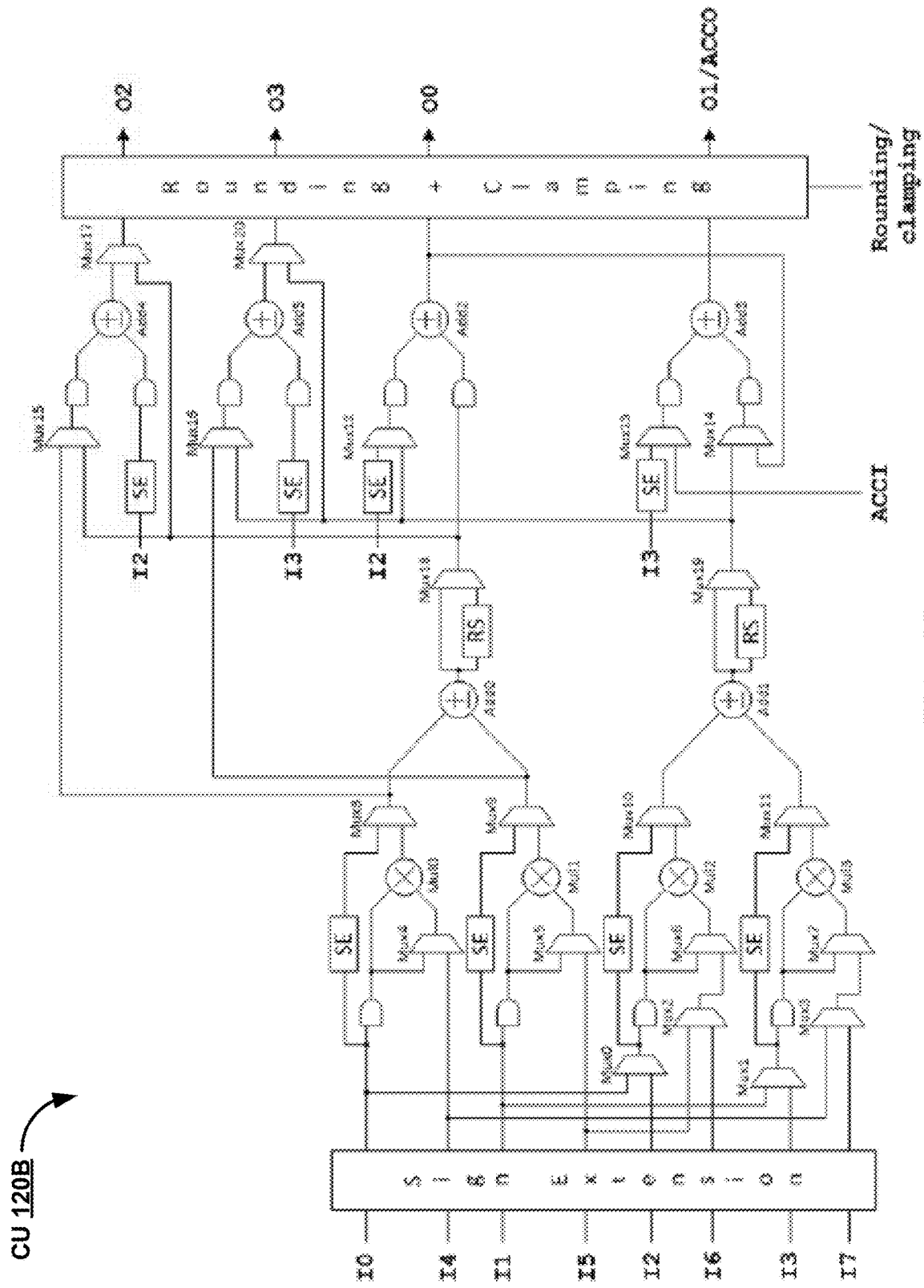
FIG. 6B illustrates a configuration of the CU of the accelerator in accordance with another example embodiment.

FIG. 6B shows a schematic diagram of another example embodiment of the Compute Unit 120, labeled CU 120B, which includes four 24×24 multipliers, eight sign extension (SE) blocks, the two RS blocks, six adders of at least 48 bit wide, and control routing muxes. For example, in some implementations, Mux8 selects between the multiplier Mul0's output or the original data from input line I0 via the SE block. Multiplying, for example, two 12-bit numbers produces a 24-bit number; since implementations of the CU 120B allows selection of the original data, that original data is sign extended to match bit width with the next stage of data that it will get added or subtracted to. In some implementations of the CU 120B, for example, a critical path is through Mul0, Add0, Add2, and Add3.

The CU block of the NPE 100 can be configured, among other operations, to perform the following arithmetic operations that are listed below (see also Tables I to III). In these example, the output of the arithmetic operation is represented using the inputs, I0-I7, and outputs, O0-O3, of the CU.

Butterfly
    O0/O2=I2+/−(I0×I4−I1×I5)
    O1/O3=O3+/−(I0×I5+I1×I4)
MAR, FIR, ACORR
    ACCO=I0×I4+I1×I5+I2×I6+I3×I7+ACCI
L2Norm
    ACCO=I0^2+I1^2+I2^2+I3^2+ACCI
ACC
    ACCO=I0++I2+I3+ACCI
XPY and XMY
    O2=I0±I2
    O3=I1±I3
XSPYS and XSMYS
    O2=I0^2±I1^2
    O3=I2^2±I3^2
aXPbY and aXMbY
    O2=I4×I0±I5×I1
    O3=I4×I3±I5×I2
aXPb and aXMb
    O2=I4×I0±I1
    O3=I4×I3±I2
XTY
    O2=I4×I0
    O3=I5×I1
XS
    O2=I0×I0
    O3=I5×I1

FIGS. 7-12 show diagrams depicting examples of the compute unit 120 configuration and data flow for some example of the operations implemented by the embodiments of the neural processing engine 100 including the CU 120A shown in FIG. 6A. In each of FIGS. 7-12, the inputs, the active outputs and gates that are needed in order to perform the corresponding operation are shown in bold, while the remaining I/O lines and gates are lightened (in gray) to show that they are not active. Similarly, in Logic Circuit Blocks 621a and 621b, only a subset of the full logic gates is active for a corresponding operation as depicted in FIGS. 7-12.

Figure 7:
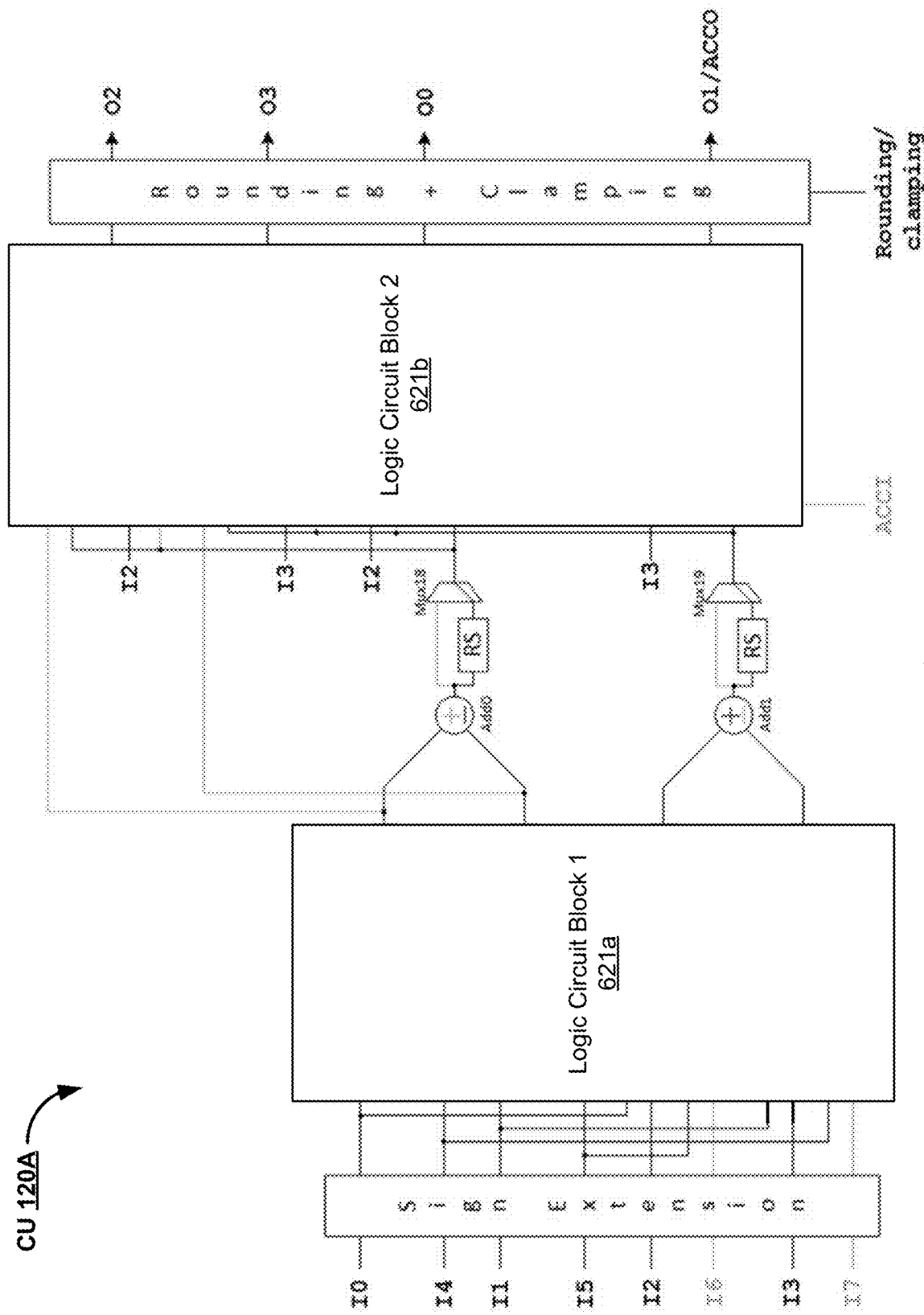
FIG. 7 shows a diagram of the example CU shown in FIG. 6A during an example implementation of a FFT (Butterfly) operation.

FIG. 7 shows an example implementation of a FFT (Butterfly) operation performed by the example CU 120A. In this example, six input lines I0, I1, I2, I3, I4, I5 provide data to the first logic circuit block 621a that may multiply the data on the input lines. Four outputs of the logic circuit block 621a are inputs to the two adders Add0 and Add1 configured between the logic circuit blocks 621a and 621b. The resultant outputs of the adders are rotated and shifted in RS box and then provided to the second logic circuit block 621b, along with some of the original input lines, for further calculations.

Figure 8:
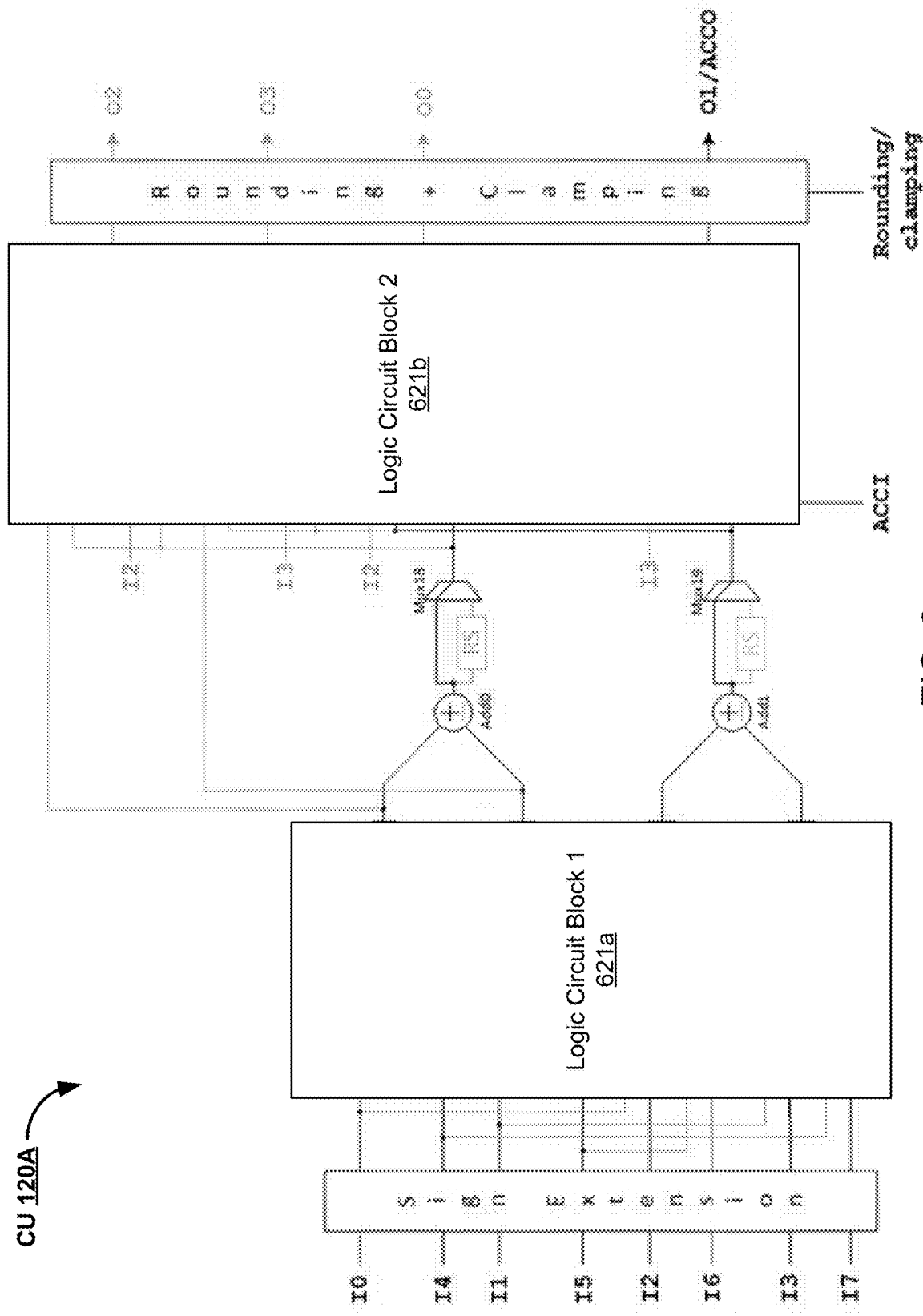
FIG. 8 shows a diagram of the example CU shown in FIG. 6A during an example implementation of MAR, FIR, ACORR operations.
Figure 9:
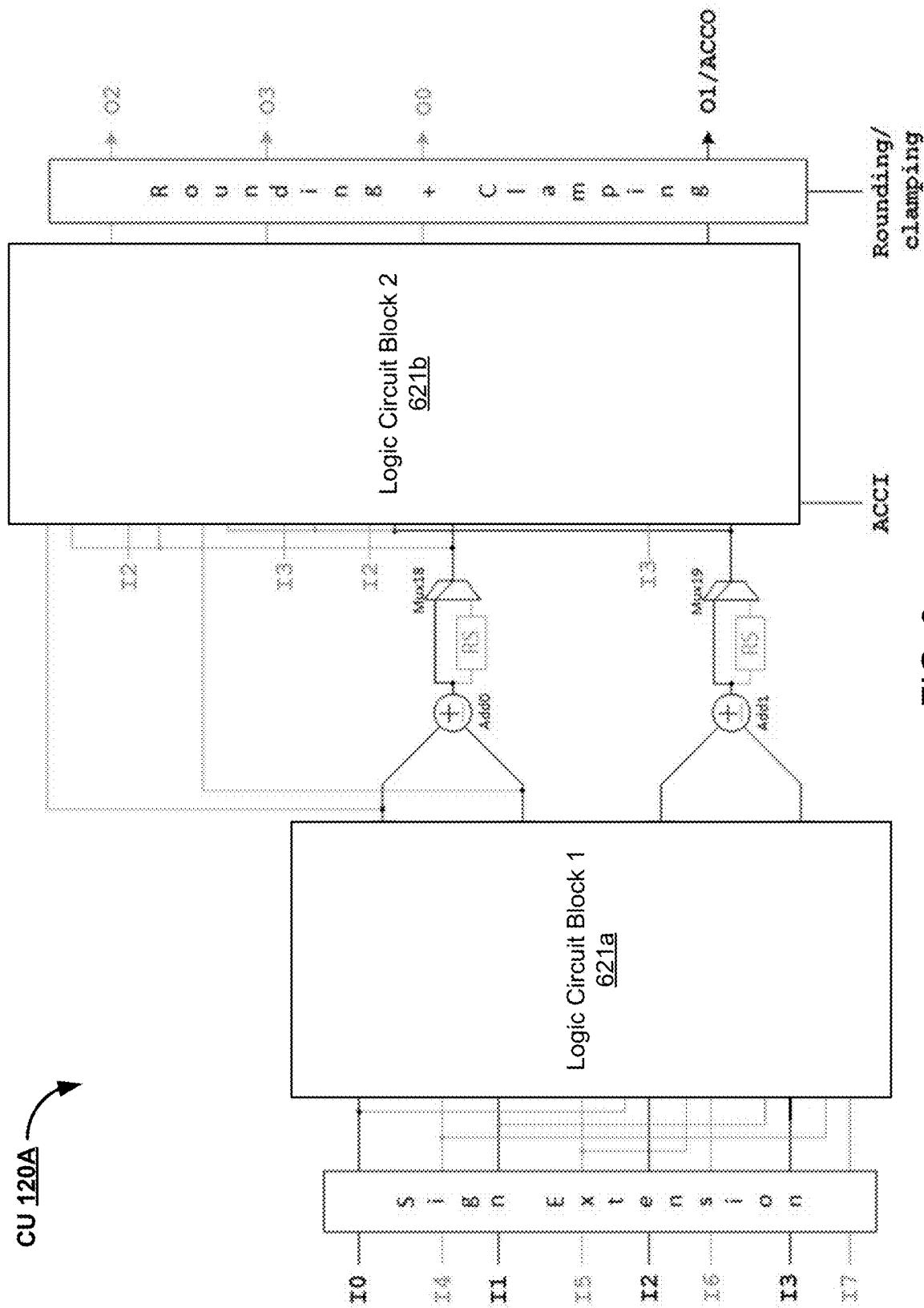
FIG. 9 shows a diagram of the example CU shown in FIG. 6A during an example implementation of a L2NORM operation.
Figure 10:
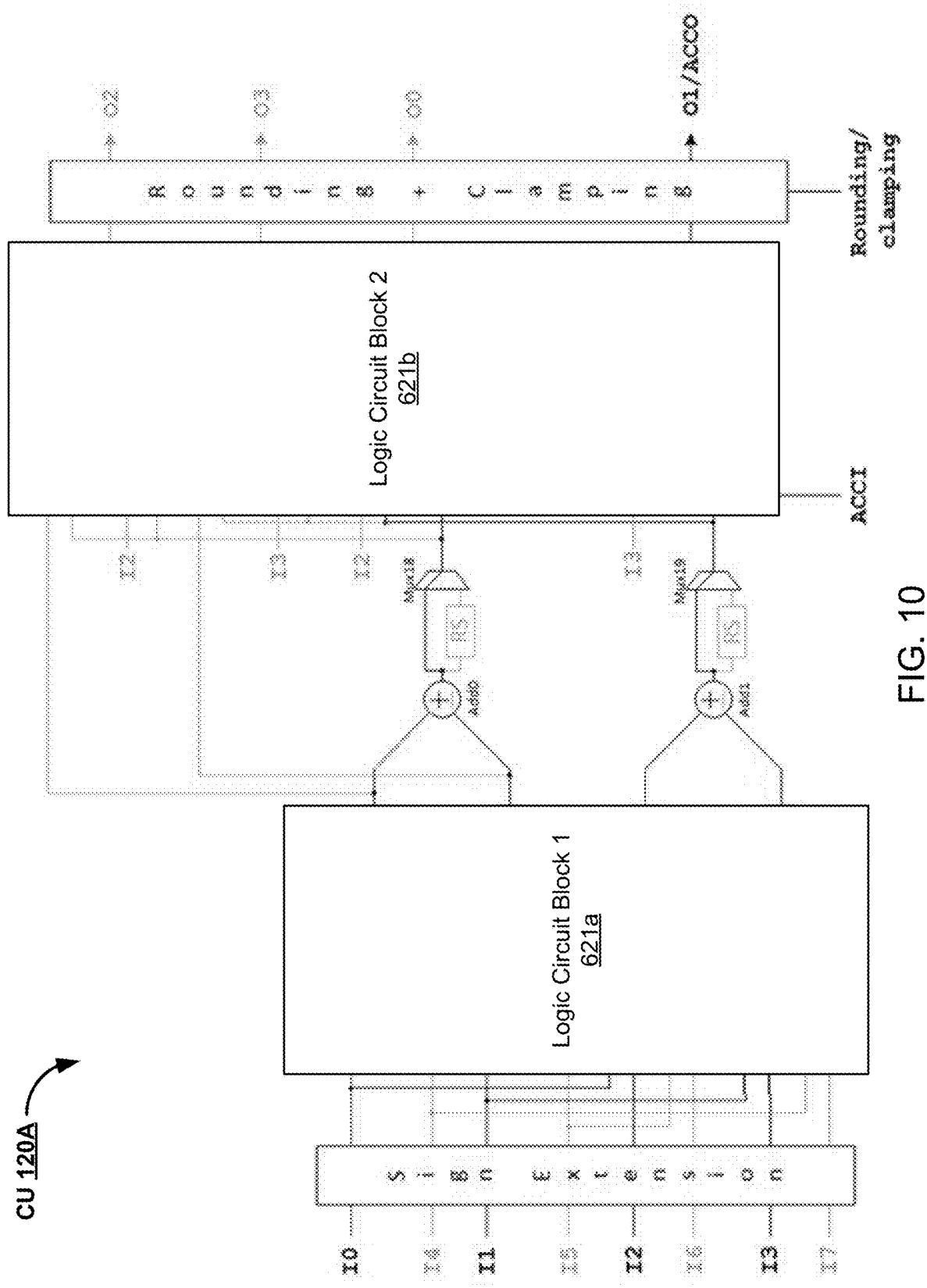
FIG. 10 shows a diagram of the example CU shown in FIG. 6A during an example implementation of an ACC operation.
Figure 11:
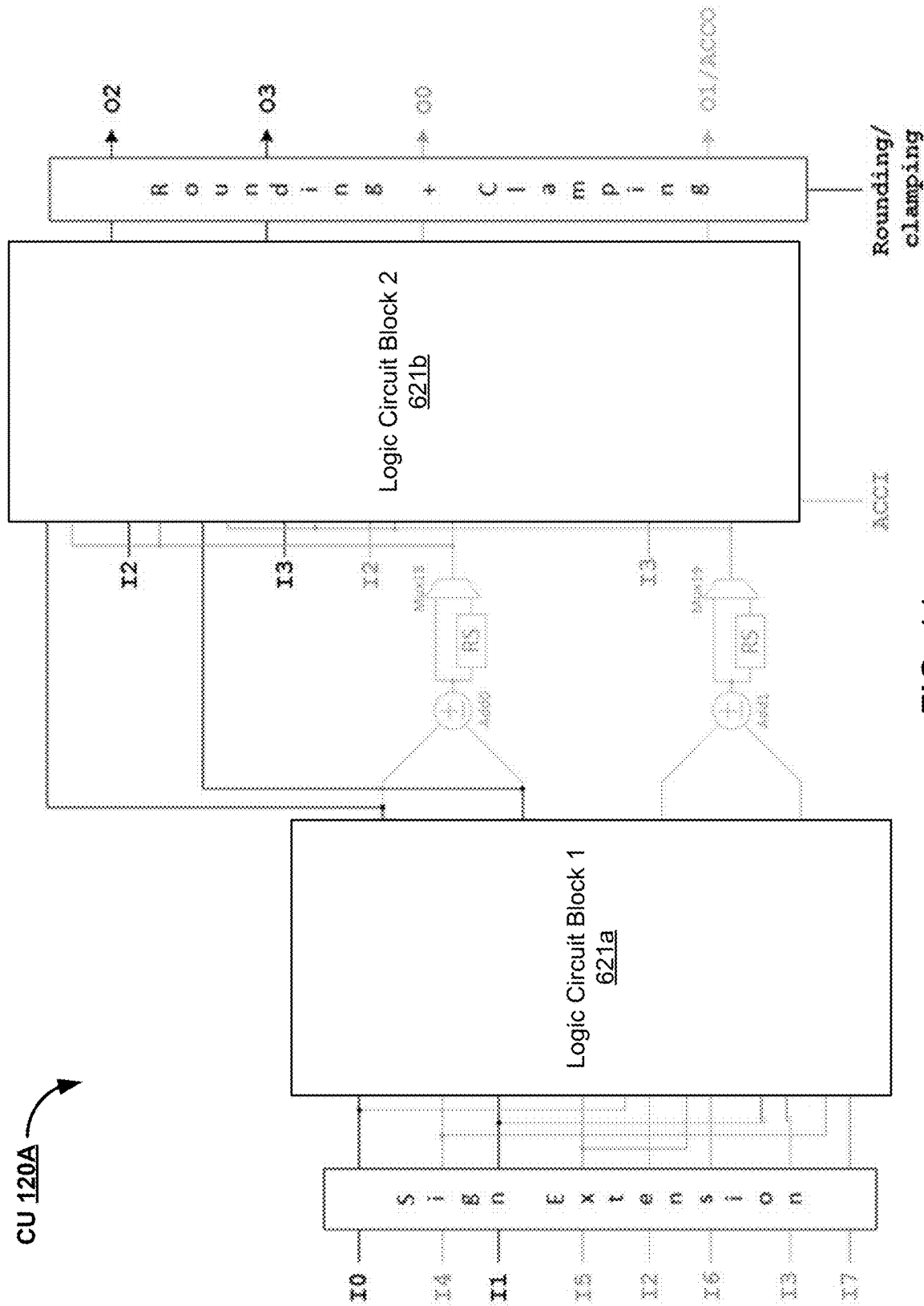
FIG. 11 shows a diagram of the example CU shown in FIG. 6A during an example implementation of XPY/XMY operations.
Figure 12:
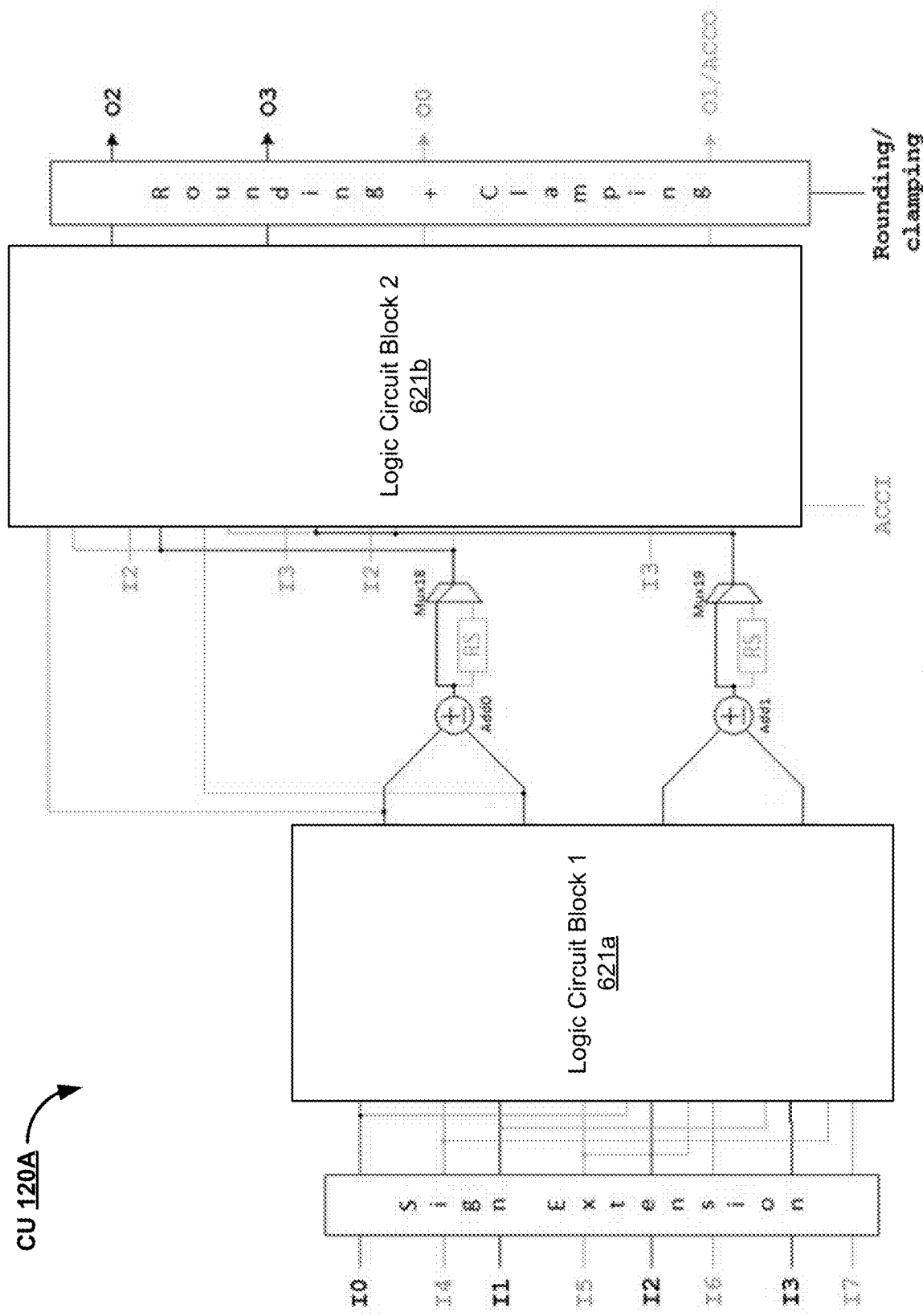
FIG. 12 shows a diagram of the example CU shown in FIG. 6A during an example implementation of XSPYS/XSMYS operations.
Figure 13:
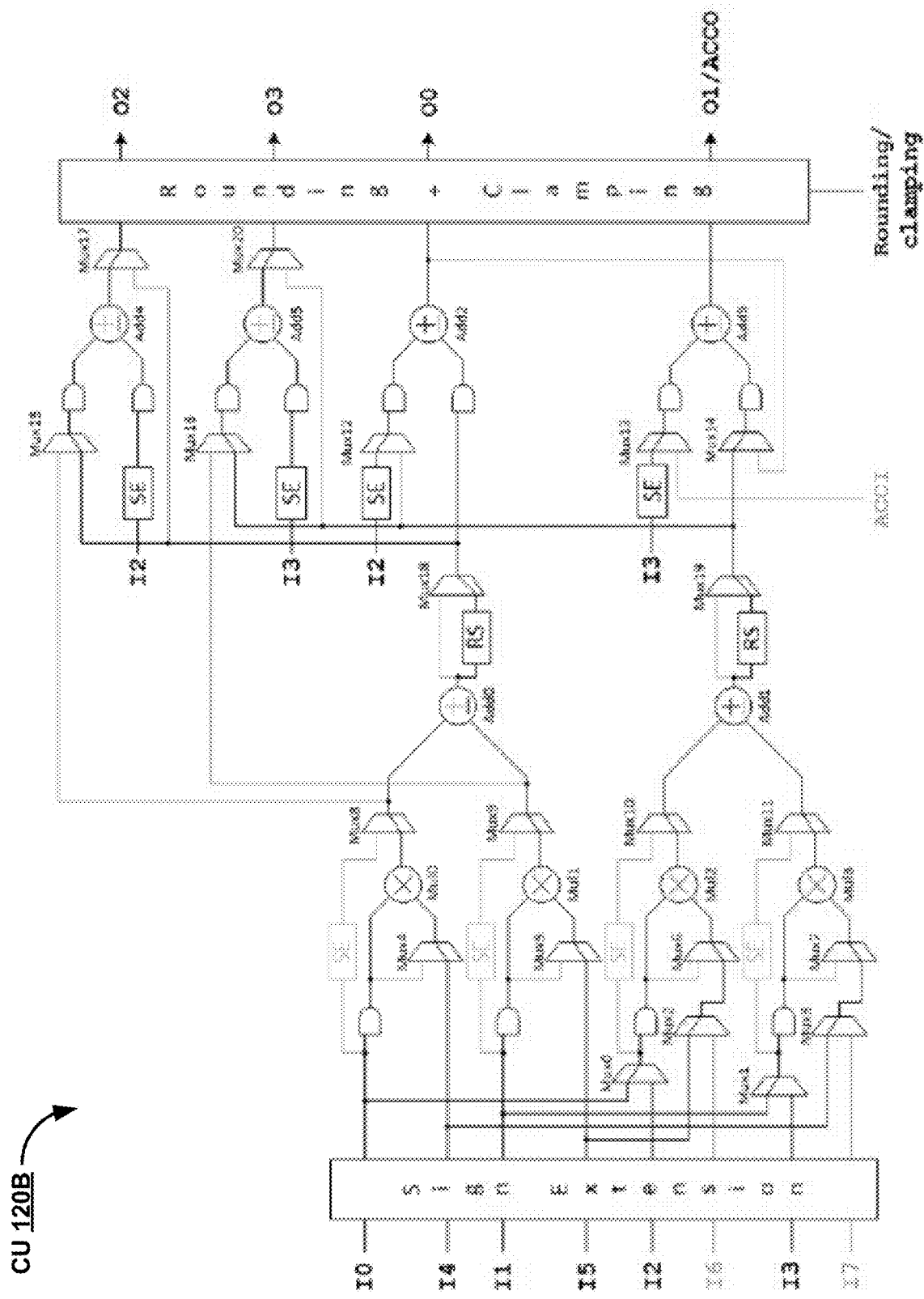
FIG. 13 shows a diagram of the example CU shown in FIG. 6B during an example implementation of a FFT (Butterfly) operation.
Figure 14:
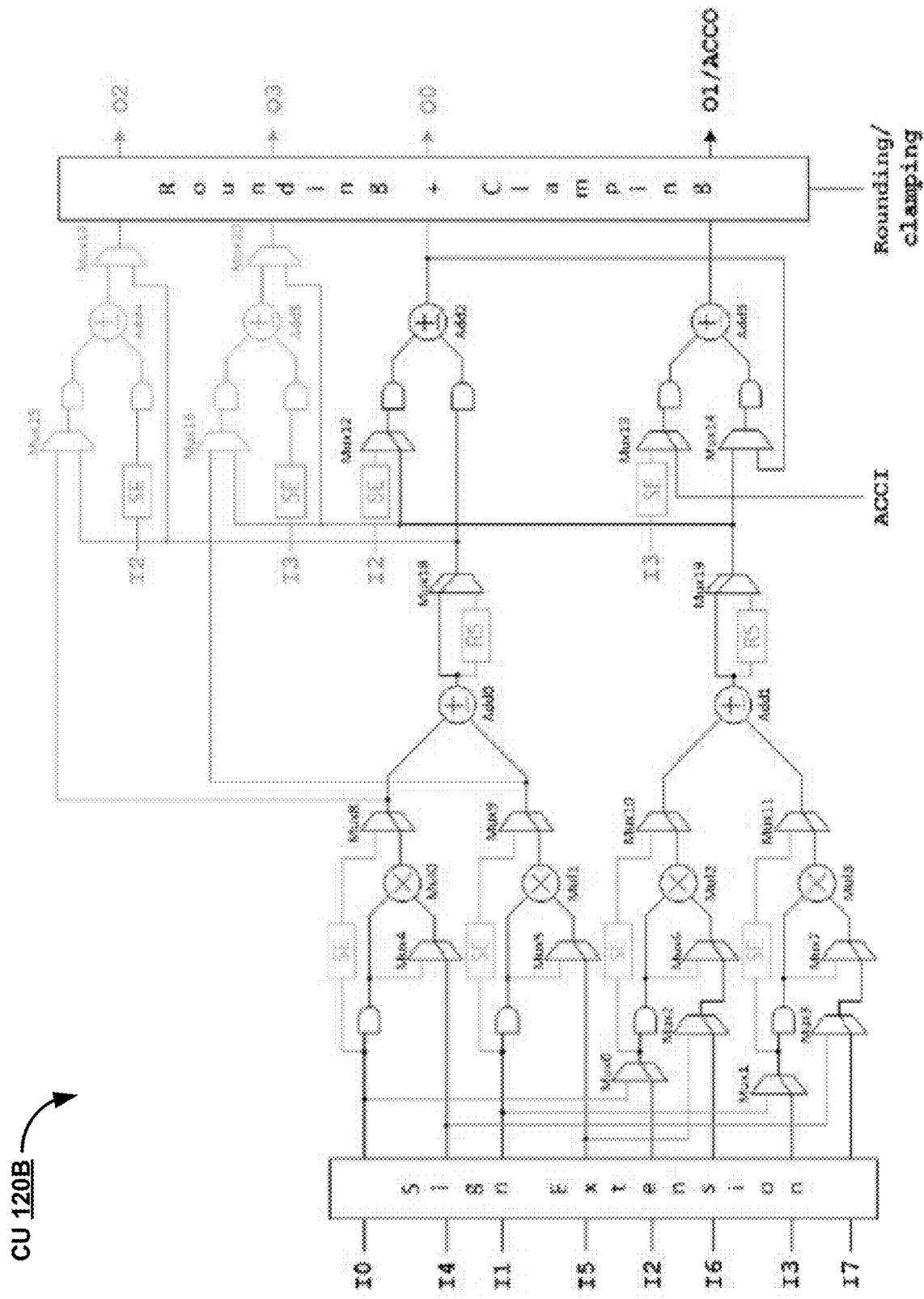
FIG. 14 shows a diagram of the example CU shown in FIG. 6B during an example implementation of MAR, FIR, ACORR operations.
Figure 15:
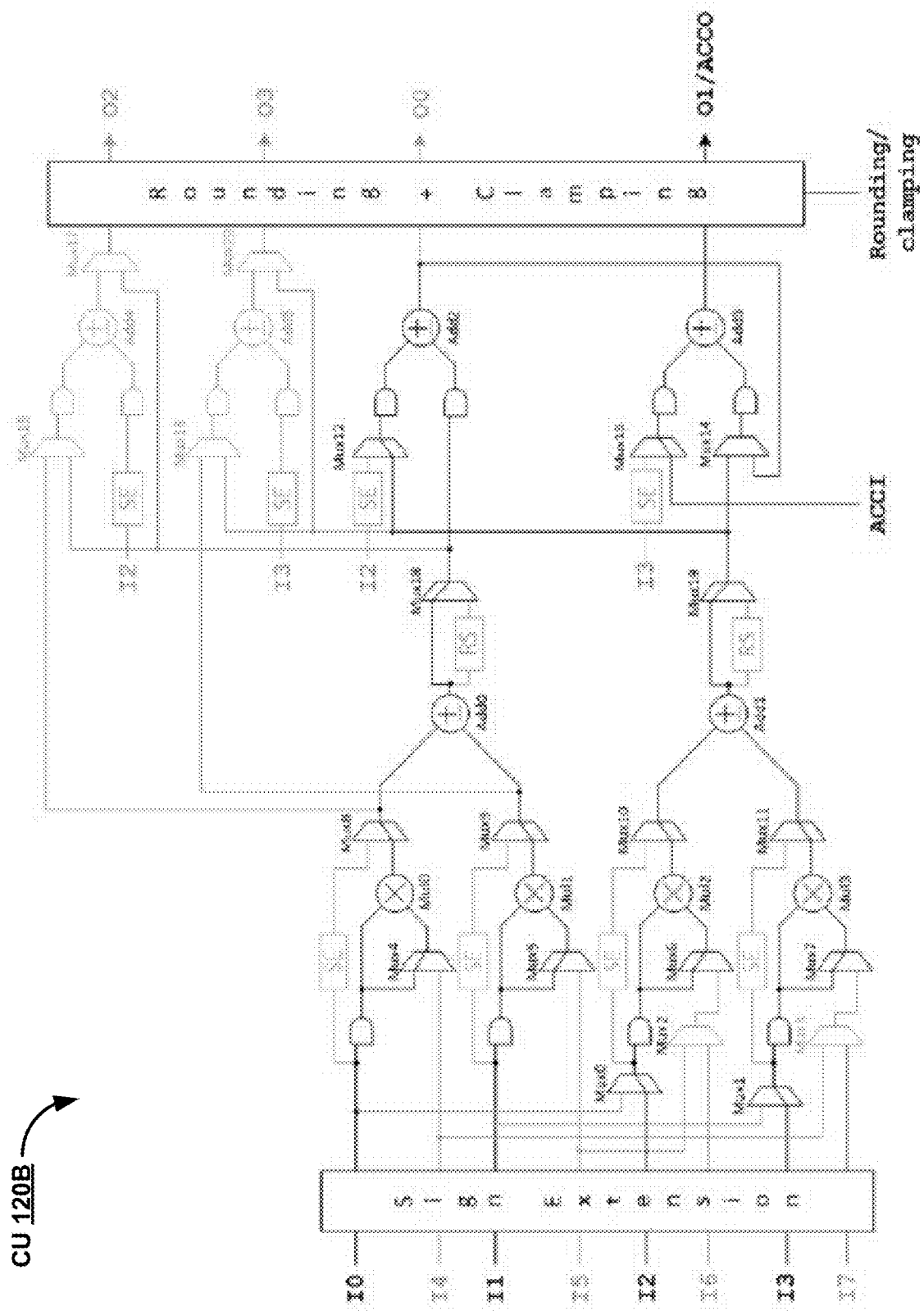
FIG. 15 shows a diagram of the example CU shown in FIG. 6B during an example implementation of a L2NORM operation.
Figure 16:
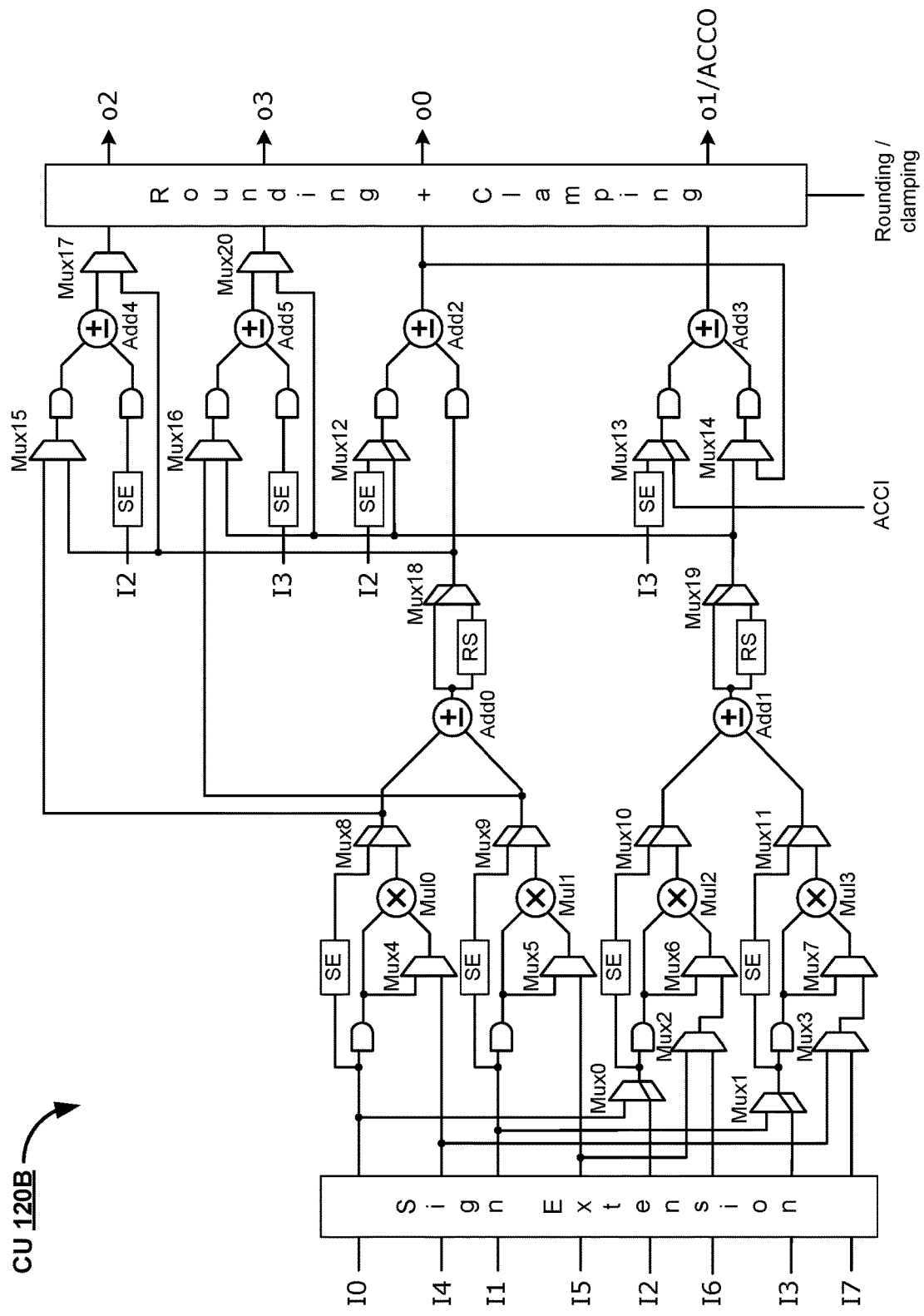
FIG. 16 shows a diagram of the example CU shown in FIG. 6B during an example implementation of an ACC operation.
Figure 17:
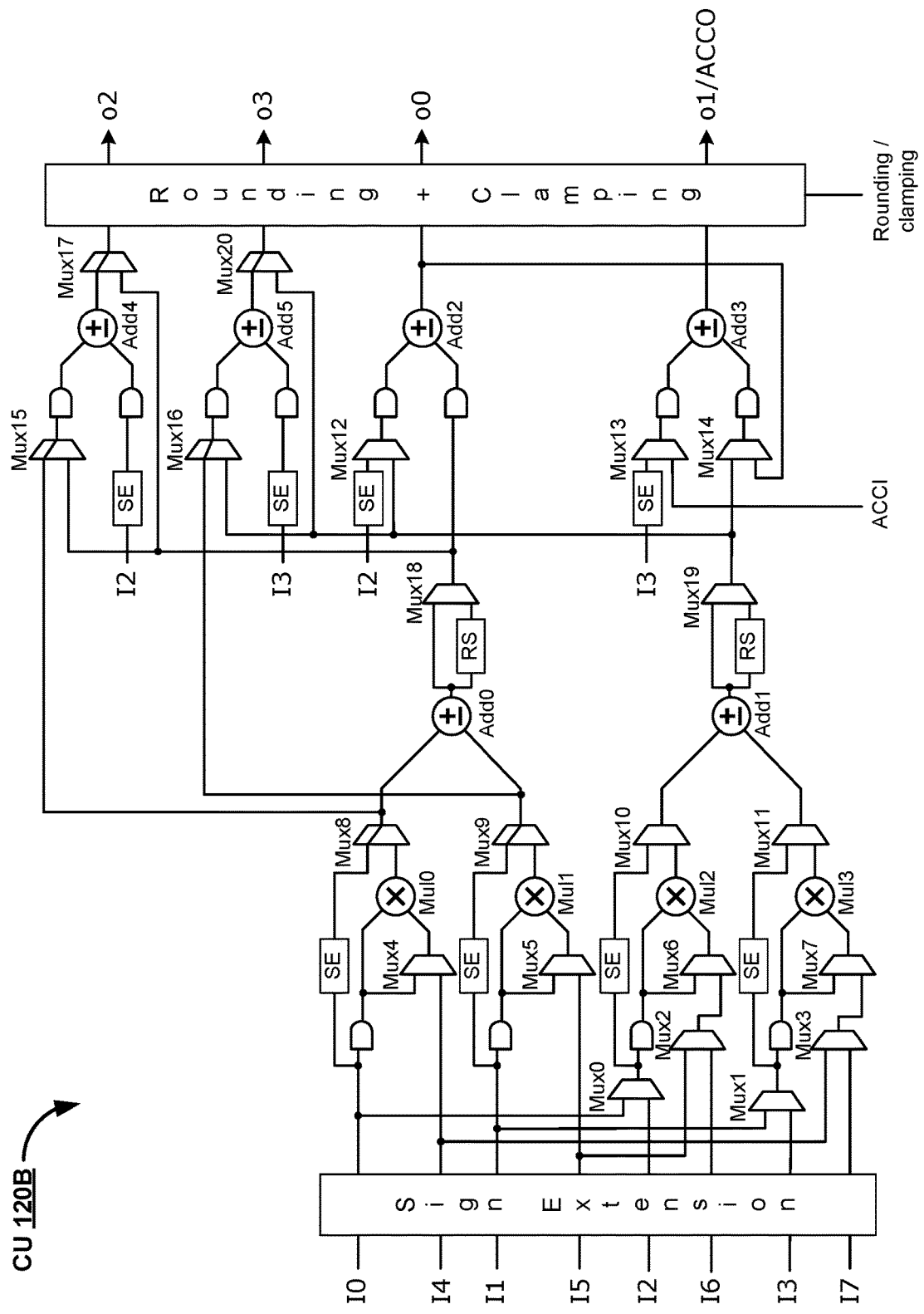
FIG. 17 shows a diagram of the example CU shown in FIG. 6B during an example implementation of XPY/XMY operations.
Figure 18:
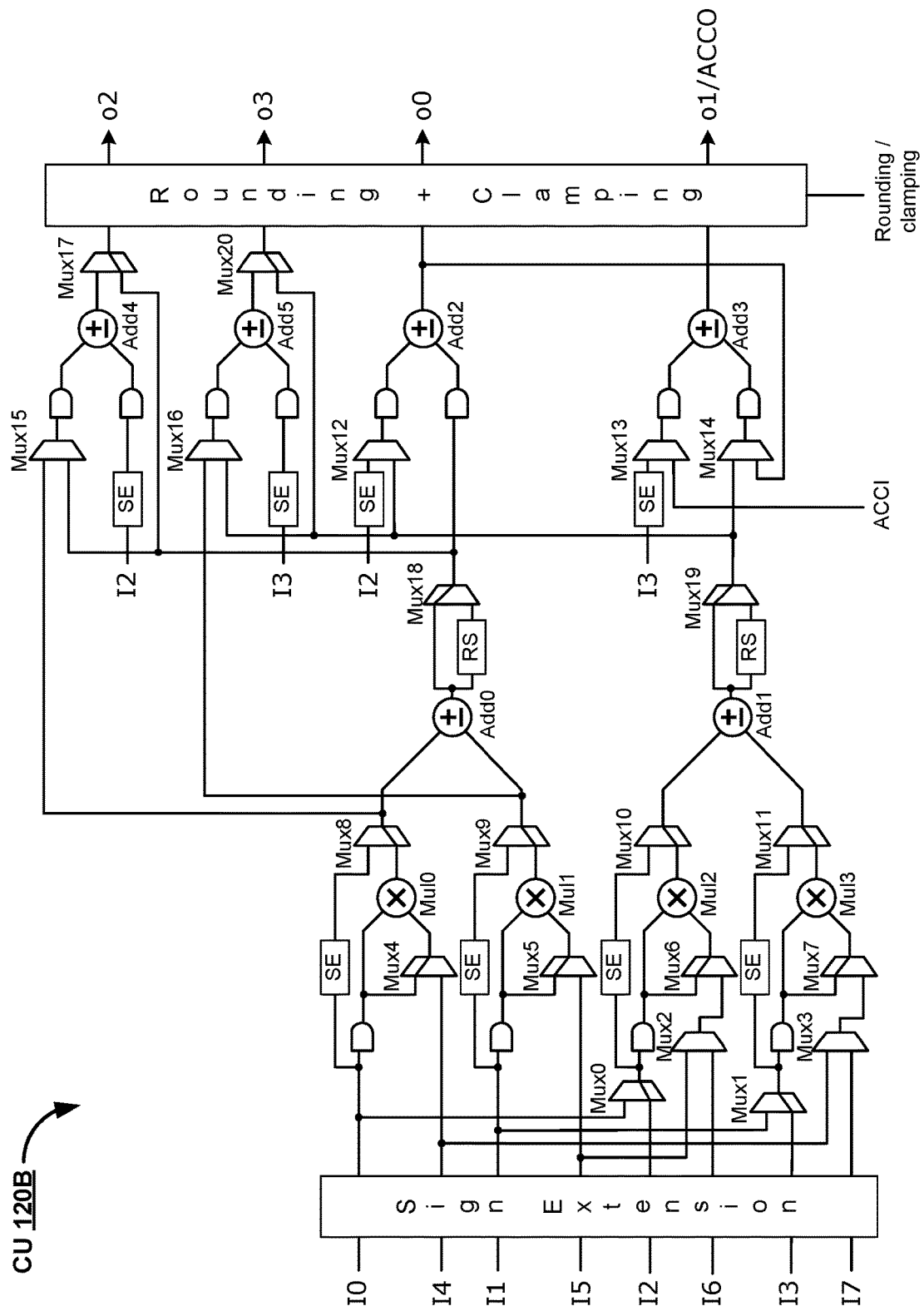
FIG. 18 shows a diagram of the example CU shown in FIG. 6B during an example implementation of XSPYS/XSMYS operations.

FIG. 8 shows an example implementation of MAR, FIR, ACORR operations performed by the example CU 120A. FIG. 9 shows an example implementation of a L2NORM operation performed by the example CU 120A. FIG. 10 an example implementation of an ACC operation performed by the example CU 120A. FIG. 11 an example implementation of XPY/XMY operations performed by the example CU 120A. FIG. 12 an example implementation of XSPYS/XSMYS operations performed by the example CU 120A.

FIGS. 13-18 show diagrams depicting examples of the compute unit 120 configuration and data flow for some example operations implemented by the neural processing engine 100 including the CU 120B shown in FIG. 6B. In each of FIGS. 13-18, the inputs, outputs and gates that are active in order to perform the corresponding operation are shown in bold, while the remaining I/O lines and gates are lightened (in gray) to show that they are not active. The example implementations of the CU 120B shown in FIGS. 13-18 correspond to the operations shown in FIGS. 7-12, respectively, for the CU 120A. As can be seen from comparison of, for example, FIG. 13 to FIG. 17, the disclosed architecture of the CU 120 optimizes power consumption based on the particular arithmetic operation that is being carried out.

Special Function Unit (SFU):

The SFU 130 of the NPE 100 performs the iteration steps required for fixed point SQRT, EXP, and LOG. For example, these operations take multiple cycles to finish, and the way the vector compute is handled is by performing one iteration of the operation on all vector elements and store the result in the TCM 110, until all elements are swept, then the next iteration goes through all elements. At each compute step, two vectors elements will be processed. Similar to CU 120, the SFU 130 is non-registered, and pure combinatorial. Example implementations of the SFU 130 for the fixed point operations SQRT, EXP, and LOG are discussed below.

SQRT:

To perform a fixed point integer SQRT on a 24 bit vector element, 12 iterations are needed.

The vector processing is done in 12 passes. At the first pass, during each cycle two 24 bits elements (x) are read from the Bank 0, and two intermediate (possibly changed) x and two intermediate y will be stored in Bank 2 and 3, with the first pass assuming y=0. After all elements are done in the first pass, the next pass starts by reading two intermediate x from Bank 2 and two y from Bank 3, stored during the previous pass, and the new intermediate values are stored in Bank 0 and 1, ping ponging TCM banks at every pass.

This process continues until 12 passes finish. The final y elements in the TCM 110 are the square root of the input x to the first pass.

Special function unit 130 encodes the pass value to b and does the necessary shift and add of the two x and y inputs in each cycle, and produces the intermediary (new) x and y outputs, ready to be stored in TCM 110.

LOG:

Fixed point 24-bit natural logarithm in an 11-pass process, in which both input and outputs are in 12.12 format. The micro-architectural flow of the operation is similar to the SQRT operation, in a way that, in each cycle two x and y, as intermediary input and outputs are read from two TCM banks and the result of the SFU calculation are written back to two other TCM banks for the next pass. Computes are also in the form of shift and add, similar to SQRT.

EXP:

Fixed point 24-bit exponential in a 10-pass process, in which both input and outputs are in 12.12 format. The micro-architecture follows the same pattern as the rest of special functions, whereby two x and y elements are fetched in each cycle from the TCM 110 and their updated value are stored in the TCM 110.

Figure 19:
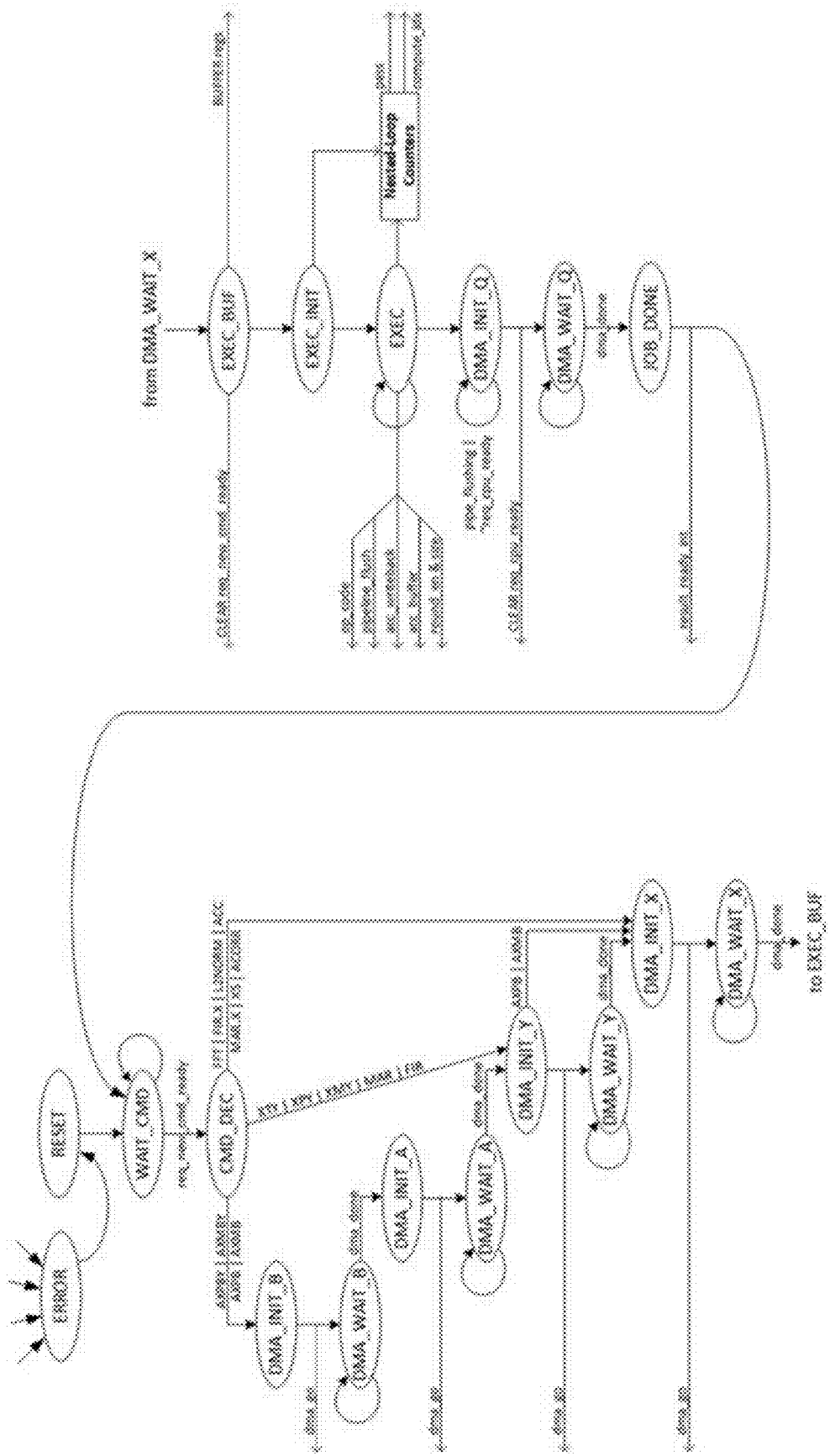
FIG. 19 shows a diagram of the example embodiment of a controller FSM (finite state machine).

Controller FSM and Loop Counters:

In various embodiments, the Controller FSM and Loop Counters 140 of the NPE 100 can include a controller state machine, such as the example of FIG. 19.

FIG. 19 shows a schematic diagram of an example implementation of the Controller FSM and Loop Counters 140 of the NPE 100.

The NPE 100 powers on to RESET, and transition to WAIT_CMD. It remains in that state for as long as no new command has been programmed to the CSR 180. Once the host processor finishes all CSR configurations, the program must set a req_new_cmd_ready flag bit in the CSR 180, by which messaging the controller to start processing the operation.

CMD_DEC state decodes the operation and transition the state machine into the proper starting DMA operand fetching. There are at maximum 4 possible operands per operation. For example, the operation AXPBY has four operands of A, X, B, and Y, while the XS operation has only one operand: X. Each DMA input of an operand involves an initialization step, in which DMA 160 is initialized with the address of which the data has to be read from the system memory, stride, offset, as well as the operation and operand in which this data is used for. Placement of the data into TCM 110 depends on these type of the operation and operand. The DMA wait states are used to wait for the DMA 160 to finish its data stream into the TCM 110 and assert a dma_done.

Once the last DMA (X) step finalizes, all remaining CSR registers (except anything related to the input data address and DMA IN) will be buffered at the EXEC_BUF state, so that the host be allowed to reprogram the CSR registers. At this step, an output flag (readable by host software) is set, such that the host program is aware that the operation data has been moved from system memory to the TCM 110 and it can be safely overwritten. All CSR fields can be reprogrammed after this point.

EXEC_INIT initializes the loop counters and prepare the NPE 100 for the start of a pipeline execution of the operation. EXEC state increment through passes (where it is needed: FFT, FIR, SFUs, ACORR) and a nested compute index. pass and compute_idx are used by the address generator block for generating the correct address as well as the read and write commands on TCM buses. op_code is the used by the address generator 150 and compute unit 120 (including SFU 130), and at the top-level for some data bus muxing purposes. pipeline_flush signals the rest of the blocks that a pass is about to finish, and the final pipeline stages of address gen/read/compute/write have to be flushed out. acc_buf and acc_writeback are used to buffer accumulator into a 24-bit temporary register and write back the buffered accumulation and the new accumulator (overall 48 bit) into a TCM block location.

Once the execution finished, the results (vector or scalar) has to flushed out from the TCM 110 to system memory. This state is handed over to the DMA 160 for data out process. The DMA_INIT_Q state, do not proceed until CPU flags the CSR 180 that system memory location is ready.

JOB_DONE sends an interrupt to the host CPU about the conclusion of the operation. The state machine returns to the WAIT_CMD for the next command.

DMA:

DMA 160 of the NPE 100 is responsible for data transfer between the TCM 110 and system memory. For every operation, the input vectors have to be stored in TCM with a given pattern that is determined for that operation. Such ordering is what will be used later by the address generator 150 to read elements of vectors from the TCM 110 for computation. In addition, when outputting the result out to the system memory, the DMA 160 is responsible to find the data in its right place inside the TCM 110 and transfer it to the system memory according the instructions set by the programmer in the CSR 19-, such as starting address, stride and offset.

Figure 20:
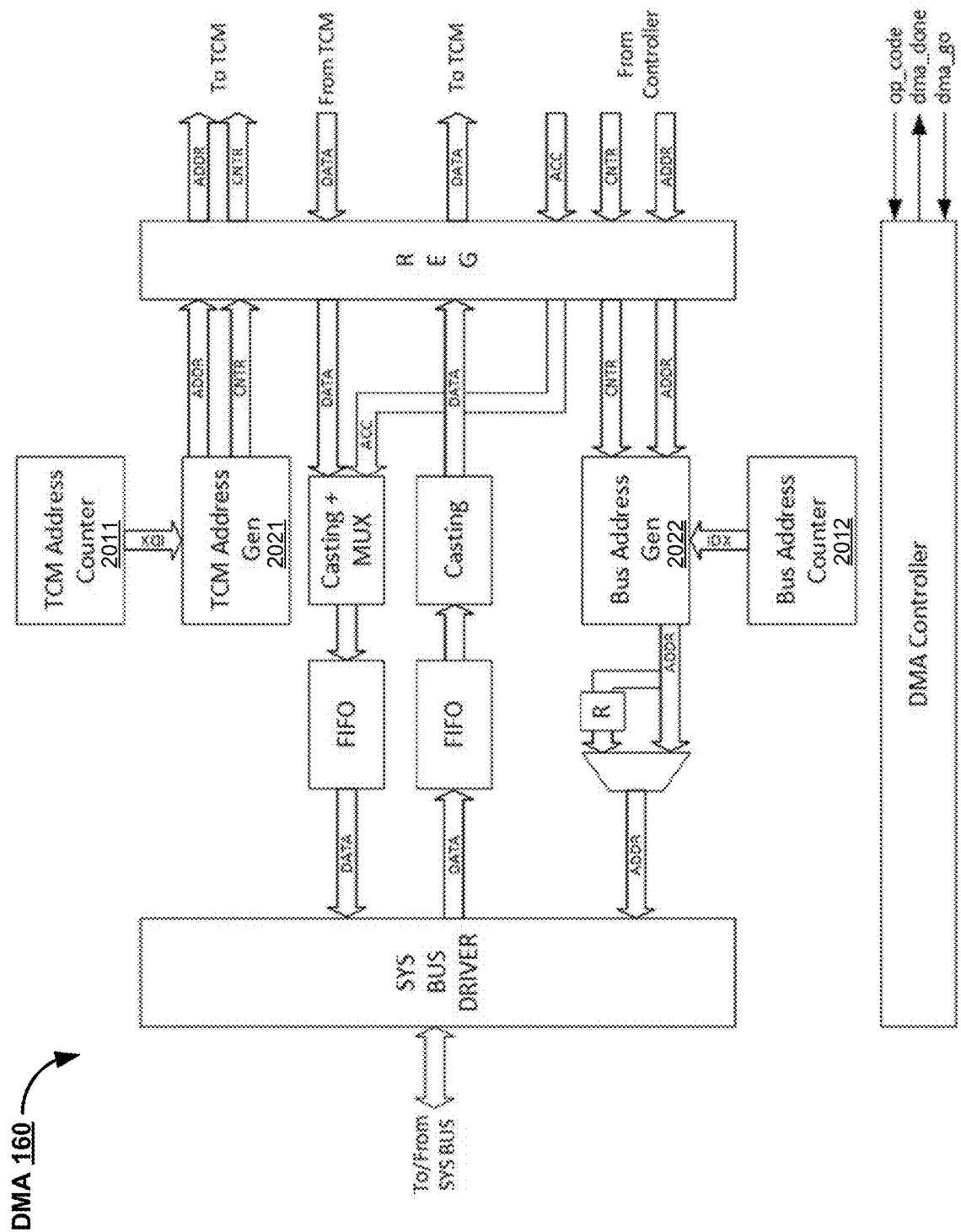
FIG. 20 shows a diagram of an example embodiment of a DMA of the accelerator.

FIG. 20 shows a schematic diagram of an example embodiment of the DMA 160 of the NPE 100. The example DMA module includes two counters, e.g., Bus Address Counter 2012 and TCM Address Counter 2011, that loop over the contents in the system memory and TCM 110. Separate address generators, e.g., Bus Address Generator 2022 and TCM Address Generator 2021, arranged for each side of the DMA (e.g., the system memory side and the TCM side) are used to generate the corresponding addresses for the counting index. In implementations, for example, the data is read from the address location generated by the Bus Address Generator 2022 from the system bus and written to different TCM's appropriate banks and rows based on the op code type. The data dumping from TCM 110 to DMA 160 also follows the same logic, in the opposite direction.

Data coming into the NPE 100 can be of different bit widths such as 8 bits, 16 bits, 12 bits, or 24 bits, etc. In the example embodiment of the TCM 110 shown in FIGS. 2A and 2B, the internal registers/memory can be implemented to operate on words having a first number of bits (e.g., 24 bits). As such, in the example DMA module shown in FIG. 20, the incoming data can be "casted" (converted) to accommodate the width of the incoming data (e.g., as 24-bit registers). In this embodiment, the DMA 160 includes Casting+Mux block, such that in implementations data can come from two different sources and the Mux can select which data to choose; that data must then be casted to e.g., 24 bits if it is has a different number of bits (8, 12, or 16 bits) or just the other input of MUX from Accumulator is to be selected.

Address Generator:

Address generator 150 of the NPE 100 takes the operating op_code, pass index (in case of FFT, FIR, ACORR, and SFUs), compute_idx (as an index of vector elements), and write_back signal and creates appropriate read and write signals for the 4 TCM banks, as well as their address. It also generates twiddle ROM address for FFT operation only. The block is combinatorial only.

Figure 21:
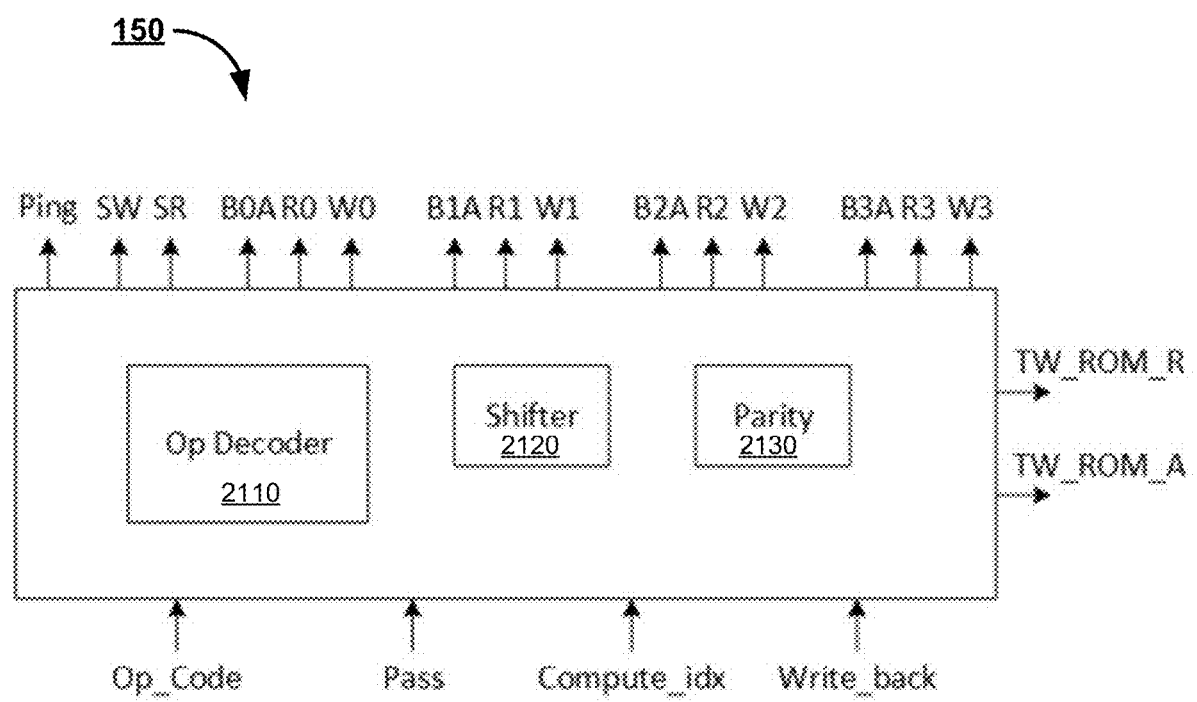
FIG. 21 shows a diagram of an example embodiment of an address generator of the accelerator.

FIG. 21 shows a schematic diagram of an example embodiment of the Address Generator 150 of the NPE 100. The Address Generator 150 includes an op decoder module 2110, a shifter module 2120, and a parity module 2130. In implementations, for example, the op decoder module 2110 of the Address Generator 150 decodes the operand code and, based on the type of the operation, generates the expected TCM banks addresses along with read and write signals for the corresponding nested-loop indices. The Address Generator 150 also performs shift and rotate operations at the shift module 2120 and parity calculation operations at the parity module 2130 for deciding on which TCM bank and row to perform the data read or write during the FFT operation.

Figure 22:
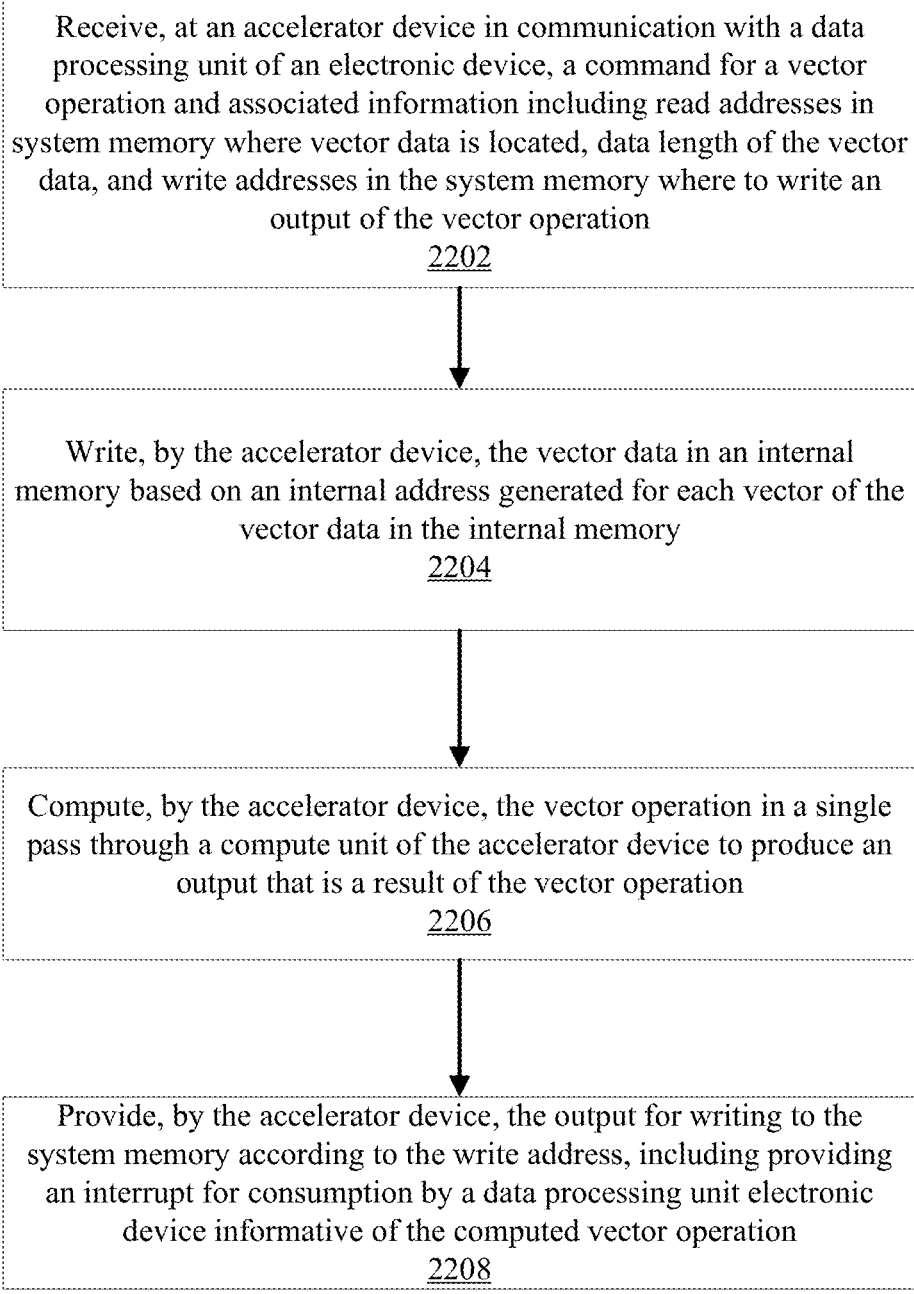
FIG. 22 illustrates a set of example operations that can be carried out to accelerate a vector operation in accordance with some embodiments.

FIG. 22 illustrates a set of example operations that can be carried out to accelerate a vector operation in accordance with some embodiments. At 2202, a command is received at an accelerator device in communication with a data processing unit of an electronic device; The command is for a vector operation and the associated information received includes read addresses in system memory where vector data is located, data length of the vector data, and write addresses in the system memory where to write an output of the vector operation. At 2204, the vector data is written in an internal memory based on an internal address generated for each vector of the vector data in the internal memory. At 2206, the vector operation is computed in a single pass through a compute unit of the accelerator device to produce an output that is a result of the vector operation. At 2208, the output is provided for writing to the system memory according to the write address, including providing an interrupt for consumption by a data processing unit electronic device informative of the computed vector operation. In one example embodiment, providing the writing the vector data in the internal memory, the computing the vector operation, and providing the output for writing to the system memory is implemented in a pipeline protocol. In another example embodiment, writing the vector data in the internal memory, computing the vector operation, and providing the output for writing to the system memory of the pipeline protocol are implemented concurrently.

In yet another example embodiment, the vector operation is a first operation that results in activation of only a first subset of logic gates, less than all logic gates in the accelerator device. In this embodiment, the above noted method further includes receiving another command for a second vector operation and associated information including read addresses in system memory where vector data for the second vector operation is located, data length of the vector data for the second vector operation, and write addresses in the system memory where to write an output of the second vector operation; writing, by the accelerator device, the vector data for the second vector operation in an internal memory; and computing the second vector operation in another single pass through the compute unit of the accelerator to produce an output that is a result of the vector operation, wherein for conducing the second vector operation, only a second subset of logic gates, different than the first set of logic gates and less than all logic gates, is activated in the accelerator device.

According to some embodiment, the vector operation includes: a Fast Fourier Transform (FFT), a Finite Impulse Response (FIR) filtering operation, a sum of two vectors, a dot multiply of two vectors, an element-wise multiply of two vectors, a linear scaling and offset transfer of a vector element, a sum of all vector elements, a sum of squares of all vectors elements, a sum of power of two of two vectors, a weighted sum of two vectors, an exponentiation operation, a logarithm operation, a square root operation, or a direct memory access (DMA) transfer.

One aspect of the disclosed technology relates to a configurable data processing accelerator for processing of a plurality of vector operations. This a configurable data processing accelerator includes a configure register to receive and store a command for a vector operation and associated information from a data processing unit of an electronic system. The associated information includes, for example, read addresses of system memory where vector data is located, data length of the vector data, and write addresses of the system memory where to write an output of the vector operation. The data processing accelerator further includes an address generator configured to generate an internal address for each vector of the vector data, and an internal memory circuit configured to store the vector data based on the generated internal address. The data processing accelerator additionally includes a compute unit comprising an arithmetic circuit including adders and multipliers; the compute unit is configured to receive vector data from the internal memory circuit and to execute the vector operation in a single pass through the compute unit to produce an output that is a result of the vector operation. The compute unit is configurable to activate only a subset of the adders and multipliers therein in accordance with the vector operation.

In one example embodiment, the address generator is configured to receive an opcode and generate the internal address based on the opcode. In another example embodiment, the address generator is configured to produce one or more of a read signal, a write signal, a read address associated with the internal memory circuit, or a write address associated with the internal memory circuit. In yet another example embodiment, the address generator is implemented using only combinational logic circuits. In still another example embodiment, the internal memory circuit includes a plurality of memory banks and a plurality of logic circuits, where each logic circuit is in communication with a corresponding memory bank to enable a read or a write operation from or to the corresponding memory bank in accordance with the vector operation. In one example embodiment, the internal memory circuit includes four memory banks and four corresponding logic circuits. In another example embodiment, the vector operation is a first vector operation, and only a first set of logic gates, less than all of the logic gates, within at least one of the plurality of logic circuits is configured to be activated in accordance with the first vector operation. In still another example embodiment, only a second set of the logic gates, different than the first set of logic gates and less than all of the logic gates, within the at least one of the plurality of logic circuits is activated in accordance with a second vector operation.

According to another example embodiment, the compute unit includes a first and a second logic circuits in a cascade configuration, the first logic circuit is configured to receive the vector data on a first plurality of input lines, and to process the vector data to produce an intermediate data on a second plurality of lines that are fewer than the first plurality of input lines, and the second logic circuit is configured to receive the intermediate data and to process the intermediate data to produce the output. In one example embodiment, the second logic circuit is further configured to receive at least some of the vector data depending on the vector operation. In another example embodiment, the second logic circuit is configured to receive a modified version of the intermediate data. In yet another example embodiment, the modified version of the intermediate data includes a sum of a portion of the intermediate data, or a rounded and shifted version of the intermediate data.

According to some example embodiments, each of the first and second logic circuits of the compute unit includes a plurality of gates, the vector operation is a first vector operation, and only a first set of gates, less than all of the plurality of gates, within the first and the second logic circuits is configured to be activated in accordance with the first vector operation. In another example embodiment, only a second set of gates, different than the first set of gates and less than all of the plurality of gates, within the first and the second logic circuits is activated in accordance with a second vector operation. In another example embodiment, the compute unit output includes an accumulator output and a set of data outputs. In some example embodiment, the data processing accelerator further includes a controller in communication with the configure register, the address generator and the compute unit to control a flow of data and commands in the configurable data processing accelerator. According to another example embodiment, the data processing accelerator also includes a DMA circuit in communication with the controller and with the internal memory circuit to enable transfer of data between the system memory and the internal memory.

In one example embodiment, the accelerator is configured to process the vector operation using a pipeline protocol that includes the following four operations: an address generation, a memory read, a compute operation and a memory write. In some example embodiments, the accelerator is operable to implement the pipeline protocol where at least two or more of the four operations are carried out concurrently. In still another example embodiment, the data processing accelerator is configured to provide an interrupt to a data processing unit informative of the result of the vector operation. In yet another example embodiment, the data processing accelerator further includes a special functions circuit in communication with the compute unit and configured to execute iteration steps associated with fixed point calculations including an exponentiation, a logarithm, or a square root vector operation.

Another aspect of the disclosed technology relates to a compact data processing accelerator that includes a tightly coupled memory including a random access memory and a plurality of logic circuits, a compute unit comprising a plurality of additional logic circuits, and an address generator circuit configured to produce a set of addresses corresponding to specific contents of the random access memory. The same compact data processing accelerator is configurable to perform a plurality of arithmetic operations based on a received command or commands, and wherein a particular subset of the logic circuits and the additional logic circuits is activated for a corresponding arithmetic operation. In one example embodiment, the plurality of arithmetic operations includes one or more of (i) a linear algebra vector algebra operation, or (ii) a non-linear mathematical operation. In another example embodiment, the accelerator is implemented as part of a biosensor, an internet of things (TOT) device, or an artificial intelligence (AI) system.

Further Examples

Various example embodiments of a compact, all-in-one data processing accelerator for a signal processing and linear and non-linear vector operations are described in this patent document. In some embodiments, the compact, all-in-one data processing accelerator can implement common algebraic and vector processing functions required for performing machine learning models or artificial intelligence algorithms on audio, bio-signals or sensor data coming from IoT sensors. Examples of such functions are listed in Tables I, II and II, but not limited to these functions. In some embodiments, a process for optimizing the data processing accelerator are disclosed, specifically for audio, bio-signals and IoT sensors, for example, to be flexible and programmable to allow common machine learning models and algorithms to be profiled and recurring functions identified and implemented as part of the accelerator to produce more accurate and power efficient models and algorithms.

In some embodiments in accordance with the present technology (example A1), a method for accelerating a vector processing operation comprises receiving, at an accelerator device in communication with a data processing unit of an electronic device, a command for a vector operation and associated information including read addresses in system memory where vector data is located, data length of the vector data, and write addresses in the system memory where to write an output of the vector operation; writing, by the accelerator device, the vector data in an internal memory based on an internal address generated for each vector of the vector data in the internal memory; computing, by accelerator device, the vector operation in a single pass through a compute unit of the accelerator to produce an output that is a result of the vector operation; and writing, by the accelerator device, the output to the system memory according to the write address, wherein the writing the output includes providing an interrupt to the data processing unit of the electronic device informative of the computed vector operation.

Example A2 includes the method of example A1, wherein the writing the vector data in the internal memory, the computing the vector operation, and writing the output to the system memory is implemented in a pipeline protocol.

Example A3 includes the method of example A2, wherein the pipeline protocol to process the vector operation by the accelerator device utilizes less clock cycles than that when the vector operation is processed by the data processing unit.

Example A4 includes the method of example A2, wherein the writing the vector data in the internal memory, the computing the vector operation, and writing the output to the system memory of the pipeline protocol is implemented concurrently.

Example A5 includes the method of example A1, wherein the vector operations includes one or more of (i) a signal processing function including one or both of Fast Fourier Transform (FFT) and Finite Impulse Response (FIR) filters; (ii) a linear algebra vector algebra function including one or more of a sum of two vectors, dot multiply of two vectors, element-wise multiply of two vectors, linear scaling and offset transfer of a vector elements, sum of all vectors elements, sum of squares of all vectors elements, sum of power of two of two vectors, and weighted sum of two vectors; or (iii) a non-linear single input function on elements of a vector including an exponential, a logarithm, or a square root.

Example A6 includes the method of example A1, further comprising: prior to the computing, receiving, at the accelerator, a go command to execute the vector operation.

Example A7 includes the method of example A1, wherein the received command includes two or more vector operations, and wherein the computing each of the two or more vector operations is computed in a serial fashion.

In some embodiments in accordance with the present technology (example A8), a data processing accelerator for processing of vector operations comprises configure register to receive and store a command for a vector operation and associated information from a data processing unit of an electronic system, the associated information including read addresses in system memory where vector data is located, data length of the vector data, and write addresses in the system memory where to write an output of the vector operation; an address generator configured to generate an internal address for each vector of the vector data; an internal memory configured to store the vector data based on the generated internal address; a compute unit comprising a arithmetic circuit units including adders and multipliers, the compute unit configured to execute the vector operation in a single pass through the compute unit to produce an output that is a result of the vector operation; and a random access memory to receive the vector data acquired from the system memory and to receive the output to be written to the system memory according to the write address.

Example A9 includes the data processing accelerator of example A8, further comprising: a special functions unit in communication with the compute unit and configured to execute iteration steps associated with fixed point calculations including exponential, logarithm, and square root vector operations.

Example A10 includes the data processing accelerator of example A9, wherein the vector operations includes one or more of (i) a signal processing function including one or both of Fast Fourier Transform (FFT) and Finite Impulse Response (FIR) filters; (ii) a linear algebra vector algebra function including one or more of a sum of two vectors, dot multiply of two vectors, element-wise multiply of two vectors, linear scaling and offset transfer of a vector elements, sum of all vectors elements, sum of squares of all vectors elements, sum of power of two of two vectors, and weighted sum of two vectors; or (iii) a non-linear single input function on elements of a vector including an exponential, a logarithm, or a square root.

Example A11 includes the data processing accelerator of example A8, wherein the accelerator is configured to process the vector operation using a pipeline protocol that utilizes less clock cycles than that when the vector operation is processed by the data processing unit.

Example A12 includes the data processing accelerator of example A11, wherein the accelerator is operable to implement the pipeline protocol concurrently.

Example A13 includes the data processing accelerator of example A8, wherein the data processing accelerator is configured to provide an interrupt to the data processing unit of the electronic system informative of the computed vector operation.

In some embodiments in accordance with the present technology (example A14), a compact data processing accelerator comprises a tightly coupled memory including a random access memory and a plurality of logic circuits; a compute unit comprising a plurality of additional logic circuits; and an address generator unit configured to produce a set of addresses corresponding to specific contents of the random access memory, wherein the same compact data processing accelerator is configurable to perform a plurality of arithmetic operations based on a received command or commands, and wherein a particular subset of the logic circuits and the additional logic circuits are activated for a corresponding arithmetic operation.

Example A15 includes the compact data processing accelerator of example A14, further comprising: a special functions unit in communication with the compute unit and configured to execute iteration steps associated with fixed point calculations including exponential, logarithm, and square root vector operations.

Example A16 includes the compact data processing accelerator of example A14, wherein the plurality of arithmetic operations includes one or more of (i) a signal processing function including one or both of Fast Fourier Transform (FFT) and Finite Impulse Response (FIR) filters; (ii) a linear algebra vector algebra function including one or more of a sum of two vectors, dot multiply of two vectors, element-wise multiply of two vectors, linear scaling and offset transfer of a vector elements, sum of all vectors elements, sum of squares of all vectors elements, sum of power of two of two vectors, and weighted sum of two vectors; or (iii) a non-linear single input function on elements of a vector including an exponential, a logarithm, or a square root.

Example A17 includes the compact data processing accelerator of example A14, wherein the compact data processing accelerator is configured to perform the plurality of arithmetic operations using a pipeline protocol that utilizes less clock cycles than that when the arithmetic operations are processed by a central processing unit.

Example A18 includes the compact data processing accelerator of example A14, wherein the compact data processing accelerator is configured to perform the plurality of arithmetic operations using less energy, based on limited activation of the particular subset of the logic circuits, than that when the arithmetic operations are processed by a central processing unit.

At least part of the implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification may be implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them.

At least some of the processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A configurable data processing accelerator for processing of a plurality of vector operations, comprising:
   a configure register to receive and store a command for a vector operation and associated information from a data processing unit of an electronic system, the associated information including read addresses of system memory where vector data is located, data length of the vector data, and write addresses of the system memory where to write an output of the vector operation;
   an address generator configured to generate an internal address for each vector of the vector data;
   an internal memory circuit configured to store the vector data based on the generated internal address;
   a compute unit comprising an arithmetic circuit including adders and multipliers, the compute unit configured to receive vector data from the internal memory circuit and to execute the vector operation in a single pass through the compute unit to produce an output that is a result of the vector operation, wherein the compute unit is configurable to activate only a subset of the adders and multipliers therein in accordance with the vector operation.

2. The configurable data processing accelerator of claim 1, wherein the address generator is configured to receive an opcode and generate the internal address based on the opcode.

3. The configurable data processing accelerator of claim 2, wherein the address generator is configured to produce one or more of a read signal, a write signal, a read address associated with the internal memory circuit, or a write address associated with the internal memory circuit.

4. The configurable data processing accelerator of claim 1, wherein the address generator is implemented using only combinational logic circuits.

5. The configurable data processing accelerator of claim 1, wherein the internal memory circuit includes a plurality of memory banks and a plurality of logic circuits, each logic circuit in communication with a corresponding memory bank to enable a read or a write operation from or to the corresponding memory bank in accordance with the vector operation.

6. The configurable data processing accelerator of claim 5, wherein the internal memory circuit includes four memory banks and four corresponding logic circuits.

7. The configurable data processing accelerator of claim 5, wherein:
   the vector operation is a first vector operation, and only a first set of logic gates, less than all of the logic gates, within at least one of the plurality of logic circuits is configured to be activated in accordance with the first vector operation.

8. The configurable data processing accelerator of claim 7, wherein only a second set of the logic gates, different than the first set of logic gates and less than all of the logic gates, within the at least one of the plurality of logic circuits is activated in accordance with a second vector operation.

9. The configurable data processing accelerator of claim 1, wherein:
the compute unit includes a first and a second logic circuits in a cascade configuration,
the first logic circuit is configured to receive the vector data on a first plurality of input lines, and to process the vector data to produce an intermediate data on a second plurality of lines that are fewer than the first plurality of input lines, and
the second logic circuit is configured to receive the intermediate data and to process the intermediate data to produce the output.

10. The configurable data processing accelerator of claim 9, wherein the second logic circuit is further configured to receive at least some of the vector data depending on the vector operation.

11. The configurable data processing accelerator of claim 9, wherein the second logic circuit is configured to receive a modified version of the intermediate data.

12. The configurable data processing accelerator of claim 11, wherein the modified version of the intermediate data includes a sum of a portion of the intermediate data, or a rounded and shifted version of the intermediate data.

13. The configurable data processing accelerator of claim 10, wherein:
each of the first and second logic circuits includes a plurality of gates;
the vector operation is a first vector operation, and
only a first set of gates, less than all of the plurality of gates, within the first and the second logic circuits is configured to be activated in accordance with the first vector operation.

14. The configurable data processing accelerator of claim 13, wherein only a second set of gates, different than the first set of gates and less than all of the plurality of gates, within the first and the second logic circuits is activated in accordance with a second vector operation.

15. The configurable data processing accelerator of claim 13, wherein the compute unit output includes an accumulator output and a set of data outputs.

16. The configurable data processing accelerator of claim 1, further including a controller in communication with the configure register, the address generator and the compute unit to control a flow of data and commands in the configurable data processing accelerator.

17. The configurable data processing accelerator of claim 16, further including a direct memory access (DMA) circuit in communication with the controller and with the internal memory circuit to enable transfer of data between the system memory and the internal memory.

18. The configurable data processing accelerator of claim 1, wherein the vector operation includes: a Fast Fourier Transform (FFT), a Finite Impulse Response (FIR) filtering operation, a sum of two vectors, a dot multiply of two vectors, an element-wise multiply of two vectors, a linear scaling and offset transfer of vector elements, a sum of all vector elements, a sum of squares of all vectors elements, a sum of power of two of two vectors, a weighted sum of two vectors, an exponentiation operation, a logarithm operation, a square root operation, or a direct memory access (DMA) transfer.

19. The configurable data processing accelerator of claim 1, wherein the accelerator is configured to process the vector operation using a pipeline protocol that includes the following four operations: an address generation, a memory read, a compute operation and a memory write.

20. The configurable data processing accelerator of claim 19, wherein the accelerator is operable to implement the pipeline protocol wherein at least two or more of the four operations are carried out concurrently.

21. The configurable data processing accelerator of claim 1, configured to provide an interrupt to a data processing unit informative of the result of the vector operation.

22. The configurable data processing accelerator of claim 1, further comprising:
a special functions circuit in communication with the compute unit and configured to execute iteration steps associated with fixed point calculations including an exponentiation, a logarithm, or a square root vector operation.

23. A method for accelerating a vector processing operation, comprising:
receiving, at an accelerator device in communication with a data processing unit of an electronic device, a command for a vector operation and associated information including read addresses in system memory where vector data is located, data length of the vector data, and write addresses in the system memory where to write an output of the vector operation;
writing, by the accelerator device, the vector data in an internal memory based on an internal address generated for each vector of the vector data in the internal memory;
computing, by the accelerator device, the vector operation in a single pass through a compute unit of the accelerator device to produce an output that is a result of the vector operation; and
providing, by the accelerator device, the output for writing to the system memory according to the write address, including providing an interrupt for consumption by a data processing unit electronic device informative of the computed vector operation.

24. The method of claim 23, wherein the writing the vector data in the internal memory, the computing the vector operation, and providing the output for writing to the system memory is implemented in a pipeline protocol.

25. The method of claim 23, wherein the writing the vector data in the internal memory, the computing the vector operation, and providing the output for writing to the system memory of the pipeline protocol are implemented concurrently.

26. The method of claim 23, wherein the vector operation includes: a Fast Fourier Transform (FFT), a Finite Impulse Response (FIR) filtering operation, a sum of two vectors, a dot multiply of two vectors, an element-wise multiply of two vectors, a linear scaling and offset transfer of a vector element, a sum of all vector elements, a sum of squares of all vectors elements, a sum of power of two of two vectors, a weighted sum of two vectors, an exponentiation operation, a logarithm operation, a square root operation, or a direct memory access (DMA) transfer.

27. The method of claim 23, wherein the vector operation is a first operation that results in activation of only a first subset of logic gates, less than all logic gates in the accelerator device, the method further comprising:

receiving another command for a second vector operation and associated information including read addresses in system memory where vector data for the second vector operation is located, data length of the vector data for the second vector operation, and write addresses in the system memory where to write an output of the second vector operation;

writing, by the accelerator device, the vector data for the second vector operation in an internal memory; and computing the second vector operation in another single pass through the compute unit of the accelerator to produce an output that is a result of the vector operation, wherein for conducting the second vector operation, only a second subset of logic gates, different than the first set of logic gates and less than all logic gates, is activated in the accelerator device.

* * * * *